United States Patent
Wang et al.

(10) Patent No.: US 7,659,342 B2
(45) Date of Patent: *Feb. 9, 2010

(54) POLYMER NANO-PARTICLE WITH POLAR CORE AND METHOD FOR MANUFACTURING SAME

(75) Inventors: Xiaorong Wang, Hudson, OH (US); Victor J. Foltz, Akron, OH (US); Dennis R. Brumbaugh, North Canton, OH (US)

(73) Assignee: Bridgestone Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/050,115

(22) Filed: Feb. 3, 2005

(65) Prior Publication Data

US 2006/0173130 A1 Aug. 3, 2006

(51) Int. Cl.
*C08L 53/02* (2006.01)
*C08L 53/00* (2006.01)

(52) U.S. Cl. .......................... 525/93; 525/98; 525/271; 525/279

(58) Field of Classification Search .................. 525/98, 525/271, 279, 93
See application file for complete search history.

(56) References Cited

U.S. PATENT DOCUMENTS

| | | |
|---|---|---|
| 3,793,402 A | 2/1974 | Owens |
| 3,840,620 A | 10/1974 | Gallagher |
| 3,972,963 A | 8/1976 | Schwab et al. |
| 4,075,186 A | 2/1978 | Ambrose et al. |
| 4,233,409 A | 11/1980 | Bulkley |
| 4,247,434 A | 1/1981 | Vanderhoff et al. |
| 4,248,986 A | 2/1981 | Lal et al. |
| 4,326,008 A | 4/1982 | Rembaum |
| 4,386,125 A | 5/1983 | Shiraki et al. |
| 4,463,129 A | 7/1984 | Shinada et al. |
| 4,471,093 A | 9/1984 | Furukawa et al. |
| 4,543,403 A | 9/1985 | Isayama et al. |
| 4,598,105 A | 7/1986 | Weber et al. |
| 4,602,052 A | 7/1986 | Weber et al. |
| 4,659,790 A | 4/1987 | Shimozato et al. |
| 4,717,655 A | 1/1988 | Fluwyler |
| 4,764,572 A | 8/1988 | Bean, Jr. |
| 4,773,521 A | 9/1988 | Chen |
| 4,774,189 A | 9/1988 | Schwartz |
| 4,788,254 A | 11/1988 | Kawakubo et al. |
| 4,829,130 A | 5/1989 | Licchelli et al. |
| 4,829,135 A | 5/1989 | Gunesin et al. |
| 4,837,274 A | 6/1989 | Kawakubo et al. |
| 4,837,401 A | 6/1989 | Hirose et al. |
| 4,861,131 A | 8/1989 | Bois et al. |
| 4,870,144 A | 9/1989 | Noda et al. |
| 4,871,814 A | 10/1989 | Gunesin et al. |
| 4,904,730 A | 2/1990 | Moore et al. |
| 4,904,732 A | 2/1990 | Iwahara et al. |
| 4,906,695 A | 3/1990 | Blizzard et al. |
| 4,920,160 A | 4/1990 | Chip et al. |
| 4,942,209 A | 7/1990 | Gunesin |
| 4,987,202 A | 1/1991 | Zeigler |
| 5,036,138 A | 7/1991 | Stamhuis et al. |
| 5,066,729 A | 11/1991 | Stayer, Jr. et al. |
| 5,073,498 A | 12/1991 | Schwartz et al. |
| 5,075,377 A | 12/1991 | Kawabuchi et al. |
| 5,120,379 A | 6/1992 | Noda et al. |
| 5,130,377 A | 7/1992 | Trepka et al. |
| 5,169,914 A | 12/1992 | Kaszas et al. |
| 5,194,300 A | 3/1993 | Cheung |
| 5,219,945 A | 6/1993 | Dicker et al. |
| 5,227,419 A | 7/1993 | Moczygemba et al. |
| 5,237,015 A | 8/1993 | Urban |
| 5,241,008 A | 8/1993 | Hall |
| 5,247,021 A | 9/1993 | Fujisawa et al. |
| 5,256,736 A | 10/1993 | Trepka et al. |

(Continued)

FOREIGN PATENT DOCUMENTS

CA 2127919 3/1995

(Continued)

OTHER PUBLICATIONS

R. P. Quirk and S. C. Galvan, Macromolecules, 34, 1192-1197 (2001).

(Continued)

*Primary Examiner*—Jeffrey C Mullis
(74) *Attorney, Agent, or Firm*—Meredith E. Hooker; Nathan Lewis (57) ABSTRACT

The present invention provides a nano-particle comprising a shell and a polar core, their preparation, and their applications in ER fluids, polymeric product, rubber composition, tire product, hard disk drive gasket, matrix composition, and engine mount etc. The shell comprises a polymer formed from formula (I) monomers and the core comprises a polymer formed from formula (II) monomers, in which $R_1$ and $R_2$ are hydrogen; $R_3$, $R_4$, $R_5$, $R_6$, and up to three of $R_7$, $R_8$, $R_9$, and $R_{10}$ are each independently selected from the group consisting of hydrogen, methyl, ethyl, propyl, and isopropyl; and at least one of $R_7$, $R_8$, $R_9$, and $R_{10}$ is a polar group that is more polar than any one of $R_1$, $R_2$, $R_3$, $R_4$, $R_5$, and $R_6$ groups.

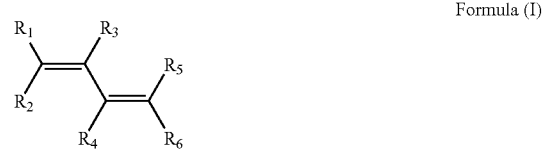

Formula (I)

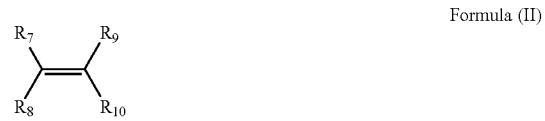

Formula (II)

21 Claims, 3 Drawing Sheets

U.S. PATENT DOCUMENTS

| | | | |
|---|---|---|---|
| 5,262,502 A | 11/1993 | Fujisawa et al. | |
| 5,290,873 A | 3/1994 | Noda et al. | |
| 5,290,875 A | 3/1994 | Moczygemba et al. | |
| 5,290,878 A | 3/1994 | Yamamoto et al. | |
| 5,329,005 A | 7/1994 | Lawson et al. | |
| 5,331,035 A | 7/1994 | Hall | |
| 5,336,712 A | 8/1994 | Austgen, Jr. et al. | |
| 5,362,794 A | 11/1994 | Inui et al. | |
| 5,395,902 A | 3/1995 | Hall | |
| 5,399,628 A | 3/1995 | Moczygemba et al. | |
| 5,405,903 A | 4/1995 | Van Westrenen et al. | |
| 5,421,866 A | 6/1995 | Stark-Kasley et al. | |
| 5,436,298 A | 7/1995 | Moczygemba et al. | |
| 5,438,103 A | 8/1995 | DePorter et al. | |
| 5,447,990 A | 9/1995 | Noda et al. | |
| 5,462,994 A | 10/1995 | Lo et al. | |
| 5,514,734 A | 5/1996 | Maxfield et al. | |
| 5,514,753 A * | 5/1996 | Ozawa et al. | 525/279 |
| 5,521,309 A | 5/1996 | Antkowiak et al. | |
| 5,525,639 A | 6/1996 | Keneko et al. | |
| 5,527,870 A | 6/1996 | Maeda et al. | |
| 5,530,052 A | 6/1996 | Takekoshi et al. | |
| 5,580,925 A | 12/1996 | Iwahara et al. | |
| 5,587,423 A | 12/1996 | Brandstetter et al. | |
| 5,594,072 A | 1/1997 | Handlin, Jr. et al. | |
| 5,614,579 A | 3/1997 | Roggeman et al. | |
| 5,627,252 A | 5/1997 | De La Croi Habimana | |
| 5,686,528 A | 11/1997 | Wills et al. | |
| 5,688,856 A | 11/1997 | Austgen, Jr. et al. | |
| 5,707,439 A | 1/1998 | Takekoshi et al. | |
| 5,728,791 A | 3/1998 | Tamai et al. | |
| 5,733,975 A | 3/1998 | Aoyama et al. | |
| 5,739,267 A | 4/1998 | Fujisawa et al. | |
| 5,742,118 A | 4/1998 | Endo et al. | |
| 5,763,551 A | 6/1998 | Wunsch et al. | |
| 5,773,521 A | 6/1998 | Hoxmeier et al. | |
| 5,777,037 A | 7/1998 | Yamanaka et al. | |
| 5,811,501 A | 9/1998 | Chiba et al. | |
| 5,834,563 A | 11/1998 | Kimura et al. | |
| 5,847,054 A | 12/1998 | McKee et al. | |
| 5,849,847 A | 12/1998 | Quirk | |
| 5,855,972 A | 1/1999 | Kaeding | |
| 5,883,173 A | 3/1999 | Elspass et al. | |
| 5,891,947 A | 4/1999 | Hall et al. | |
| 5,905,116 A | 5/1999 | Wang et al. | |
| 5,910,530 A | 6/1999 | Wang et al. | |
| 5,955,537 A | 9/1999 | Steininger et al. | |
| 5,986,010 A | 11/1999 | Clites et al. | |
| 5,994,468 A | 11/1999 | Wang et al. | |
| 6,011,116 A | 1/2000 | Aoyama et al. | |
| 6,020,446 A | 2/2000 | Okamoto et al. | |
| 6,025,416 A | 2/2000 | Proebster et al. | |
| 6,025,445 A | 2/2000 | Chiba et al. | |
| 6,060,549 A | 5/2000 | Li et al. | |
| 6,060,559 A | 5/2000 | Feng et al. | |
| 6,087,016 A | 7/2000 | Feeney et al. | |
| 6,087,456 A | 7/2000 | Sakaguchi et al. | |
| 6,106,953 A | 8/2000 | Zimmermann et al. | |
| 6,117,932 A | 9/2000 | Hasegawa et al. | |
| 6,121,379 A | 9/2000 | Yamanaka et al. | |
| 6,147,151 A | 11/2000 | Fukumoto et al. | |
| 6,180,693 B1 | 1/2001 | Tang et al. | |
| 6,191,217 B1 | 2/2001 | Wang et al. | |
| 6,197,849 B1 | 3/2001 | Zilg et al. | |
| 6,204,354 B1 | 3/2001 | Wang et al. | |
| 6,225,394 B1 | 5/2001 | Lan et al. | |
| 6,252,014 B1 | 6/2001 | Knauss | |
| 6,255,372 B1 | 7/2001 | Lin et al. | |
| 6,268,451 B1 | 7/2001 | Faust et al. | |
| 6,277,304 B1 | 8/2001 | Wei et al. | |
| 6,348,546 B2 | 2/2002 | Hiiro et al. | |
| 6,359,075 B1 | 3/2002 | Wollum et al. | |
| 6,379,791 B1 * | 4/2002 | Cernohous et al. | 428/355 R |
| 6,383,500 B1 | 5/2002 | Wooley et al. | |
| 6,395,829 B1 | 5/2002 | Miyamoto et al. | |
| 6,420,486 B1 | 7/2002 | DePorter et al. | |
| 6,437,050 B1 | 8/2002 | Krom et al. | |
| 6,441,090 B1 | 8/2002 | Demirors et al. | |
| 6,448,353 B1 * | 9/2002 | Nelson et al. | 526/265 |
| 6,489,378 B1 | 12/2002 | Sosa et al. | |
| 6,573,313 B2 | 6/2003 | Li et al. | |
| 6,573,330 B1 | 6/2003 | Fujikake et al. | |
| 6,598,645 B1 | 7/2003 | Larson | |
| 6,649,702 B1 | 11/2003 | Rapoport et al. | |
| 6,663,960 B1 | 12/2003 | Murakami et al. | |
| 6,689,469 B2 | 2/2004 | Wang et al. | |
| 6,693,746 B1 | 2/2004 | Nakamura et al. | |
| 6,706,813 B2 | 3/2004 | Chiba et al. | |
| 6,727,311 B2 | 4/2004 | Ajbani et al. | |
| 6,737,486 B2 | 5/2004 | Wang | |
| 6,750,297 B2 | 6/2004 | Yeu et al. | |
| 6,759,464 B2 | 7/2004 | Ajbani et al. | |
| 6,774,185 B2 | 8/2004 | Lin et al. | |
| 6,777,500 B2 | 8/2004 | Lean et al. | |
| 6,780,937 B2 | 8/2004 | Castner | |
| 6,835,781 B2 | 12/2004 | Kondou et al. | |
| 6,858,665 B2 | 2/2005 | Larson | |
| 6,861,462 B2 | 3/2005 | Parker et al. | |
| 6,872,785 B2 | 3/2005 | Wang et al. | |
| 6,875,818 B2 | 4/2005 | Wang | |
| 6,908,958 B2 | 6/2005 | Maruyama et al. | |
| 6,956,084 B2 | 10/2005 | Wang et al. | |
| 7,056,840 B2 | 6/2006 | Miller et al. | |
| 7,071,246 B2 | 7/2006 | Xie et al. | |
| 7,112,369 B2 | 9/2006 | Wang et al. | |
| 7,193,004 B2 | 3/2007 | Weydert et al. | |
| 7,205,370 B2 | 4/2007 | Wang et al. | |
| 7,217,775 B2 | 5/2007 | Castner | |
| 7,238,751 B2 | 7/2007 | Wang et al. | |
| 7,244,783 B2 | 7/2007 | Lean et al. | |
| 7,291,394 B2 | 11/2007 | Winkler et al. | |
| 7,347,237 B2 | 3/2008 | Xie et al. | |
| 7,408,005 B2 | 8/2008 | Zheng et al. | |
| 2002/0045714 A1 | 4/2002 | Tomalia et al. | |
| 2002/0095008 A1 | 7/2002 | Heinrich et al. | |
| 2002/0144401 A1 | 10/2002 | Nogueroles Vines et al. | |
| 2003/0004250 A1 | 1/2003 | Ajbani et al. | |
| 2003/0032710 A1 | 2/2003 | Larson | |
| 2003/0124353 A1 | 7/2003 | Wang et al. | |
| 2003/0130401 A1 | 7/2003 | Lin et al. | |
| 2003/0149185 A1 | 8/2003 | Wang et al. | |
| 2003/0198810 A1 | 10/2003 | Wang et al. | |
| 2003/0225190 A1 | 12/2003 | Borbely et al. | |
| 2004/0033345 A1 | 2/2004 | Dubertret et al. | |
| 2004/0059057 A1 | 3/2004 | Swisher et al. | |
| 2004/0091546 A1 | 5/2004 | Johnson et al. | |
| 2004/0127603 A1 | 7/2004 | Lean et al. | |
| 2004/0143064 A1 | 7/2004 | Wang | |
| 2004/0198917 A1 | 10/2004 | Castner | |
| 2005/0101743 A1 | 5/2005 | Stacy et al. | |
| 2005/0182158 A1 | 8/2005 | Ziser et al. | |
| 2005/0192408 A1 | 9/2005 | Lin et al. | |
| 2005/0197462 A1 | 9/2005 | Wang et al. | |
| 2005/0203248 A1 | 9/2005 | Zheng et al. | |
| 2005/0215693 A1 | 9/2005 | Wang et al. | |
| 2005/0228072 A1 * | 10/2005 | Winkler et al. | 523/171 |
| 2005/0228074 A1 | 10/2005 | Wang et al. | |
| 2005/0282956 A1 | 12/2005 | Bohm et al. | |
| 2006/0084722 A1 | 4/2006 | Lin et al. | |
| 2006/0173115 A1 | 8/2006 | Wang et al. | |
| 2006/0235128 A1 | 10/2006 | Bohm et al. | |
| 2007/0027264 A1 | 2/2007 | Wang et al. | |
| 2007/0135579 A1 | 6/2007 | Obrecht et al. | |
| 2007/0142550 A1 | 6/2007 | Wang et al. | |

| | | | |
|---|---|---|---|
| 2007/0142559 | A1 | 6/2007 | Wang et al. |
| 2007/0149649 | A1 | 6/2007 | Wang et al. |
| 2007/0161754 | A1 | 7/2007 | Bohm et al. |
| 2007/0185273 | A1 | 8/2007 | Hall et al. |
| 2007/0196653 | A1 | 8/2007 | Hall et al. |
| 2008/0145660 | A1 | 6/2008 | Wang et al. |
| 2008/0149238 | A1 | 6/2008 | Kleckner et al. |
| 2008/0160305 | A1 | 7/2008 | Wang et al. |
| 2008/0286374 | A1 | 11/2008 | Wang et al. |
| 2008/0305336 | A1 | 12/2008 | Wang et al. |
| 2009/0005491 | A1 | 1/2009 | Warren et al. |
| 2009/0048390 | A1 | 2/2009 | Wang et al. |
| 2009/0054554 | A1 | 2/2009 | Wang et al. |
| 2009/0270558 | A1 | 10/2009 | Gandon-pain et al. |

FOREIGN PATENT DOCUMENTS

| | | |
|---|---|---|
| DE | 3434983 | 4/1986 |
| DE | 4241538 | 6/1994 |
| EP | 143500 | 6/1985 |
| EP | 265142 | 4/1988 |
| EP | 0322905 | 7/1989 |
| EP | 0352042 | 1/1990 |
| EP | 0472344 | 2/1992 |
| EP | 0 590 491 A2 | 4/1994 |
| EP | 0742268 | 11/1996 |
| EP | 1 099 728 A1 | 5/2001 |
| EP | 1 134 251 A1 | 9/2001 |
| EP | 1783168 | 5/2007 |
| FR | 2099645 | 3/1972 |
| JP | 01279943 | 1/1989 |
| JP | 2191619 | 7/1990 |
| JP | 2196893 | 8/1990 |
| JP | 05132605 | 5/1993 |
| JP | 06248017 | 9/1994 |
| JP | 7011043 | 1/1995 |
| JP | 08-199062 | 8/1996 |
| JP | 2000-514791 | 11/2000 |
| JP | 2003-0095640 | 4/2003 |
| JP | 2006-072283 | 3/2006 |
| JP | 2006-106596 | 4/2006 |
| JP | 2007-304409 | 11/2007 |
| WO | 0 265 142 A2 | 4/1988 |
| WO | WO 91/04992 | 4/1991 |
| WO | 9704029 | 2/1997 |
| WO | WO 01/87999 A2 | 11/2000 |
| WO | WO 02/31002 A1 | 4/2002 |
| WO | WO 02/081233 | 10/2002 |
| WO | WO 02/100936 | 12/2002 |
| WO | 0332061 | 4/2003 |
| WO | WO 03/085040 | 10/2003 |
| WO | WO 2003/06557 * | 12/2003 |
| WO | WO2004/058874 | 7/2004 |
| WO | 2006/069793 | 7/2006 |
| WO | 2008/079276 | 7/2008 |
| WO | 2008/079807 | 7/2008 |
| WO | 2009/006434 | 1/2009 |

OTHER PUBLICATIONS

M. Moller, J.P. Spaz, A. Roescher, S. Mobmer, S. T. Selvan, H. A. Klok, Macromol. Symp. 117, 207-218 (1997).

T. Cosgrove, J. S. Phipps, R. M. Richardson, Macromolecules, 26, 4363-4367 (1993).

S. Mossmer, J. P. Spatz, M. Moller, T. Aberle, J. Schmidt, W. Burchard, Macromolecules, 33, 4791-4798 (2000).

E. Mendizabal, J.E. Pulg, A. Aguiar, S. Gonzalez-Villegas Functionalized Core Shell Polymers Prepared by Microemulsion. Star Polymers by Immobilizing Functional Block Copolymers, by Koji Ishizu, Tokyo Institute of Technology, Meguro-ku, Tokyo, Japan, Star and Hyperbranched Polymers, 1999, ISBN 0-8247-1986-7.

Formation of Worm-like Micelles from a Polystyrene-Polybutadiene-Polystyrene Block Copolymer in Ethyl Acetate, Canham et al., J.C.S. Faraday I, 1980, 76, 1857-1867.

Association of Block Copolymers in Selective Solvents, 1 Measurements on Hydrogenated Poly(styrene-isoprene) in Decane and in trans-Decalin, Mandema et al., Makromol. Chem. 180, 1521-1538 (1979).

Light-Scattering Studies of a Polystyrene-Poly(methyl methacrylate) Two-Blcok Copolymer in Mixed Solvents, Utiyama et al. Macromolecules vol. 7, No. 4, Jul.-Aug. 1974.

Greenwod, N.N.; Earnshaw, A., Chemistry of the Elements, pp. 1126-1127, Pergaroen Press, New York 1984.

Functionalized Core-Shell Polymers Prepared by Microemulsion Polymerization, E. Mendizabal et al., Dept. Of Ingenieria Quimica, Unviv. De Guadalajara, MX, 477/ANTE 97/1733-1737.

Kink-Block and Gauche-Block Structures of Bimolecular Films, Gehard Lagaly, Chem. Int. Ed. Engl. vol. 15 (1976) No. 10, pp. 575-586.

Linear Viscoelasticity of Disordered Polystyrene-Polyisoprene . . . Layered-Silicate Nanocomposites, J. Ren, Dept. Of Chem Eng. Univ. of Houston, Macromol. 2000, pp. 3739-3746.

Rheology of End-Tethered Polymer Layered Silicate Nanocomposites, R. Krishnamoorti et al., Macromol. 1997, 30, 4097-4102.

Rheology of Nanocomposites Based on Layered Silicates and Polyamide-12, B. Hoffman et al., Colloid Polm. Sci. 278:629-636 (2000).

Quaternary Ammonium Compounds, Encyclopedia of Chem Tech., 4th Ed. vol. 20, 1996, Wiley & Sons, pp. 739-767.

Dendritic Macromolecules: Synthesis of Starburst Dendrimers, Donald A. Tomalia et al., Macromolecules vol. 19, No. 9, 1986, contribution from Functional Polymers/Processes and the Analytical Laboratory, Dow Chemical, Midland, MI 48640, pp. 2466-2468.

Preparation and Characterization of Heterophase Blends of Polycaprolactam and Hydrogenated Polydienes, David F. Lawson et al., pp. 2331-2351, Central Research Labs., The Firestone Tire and Rubber Col, Akron, OH 44317, Journal of Applied Polymer Science, vol. 39, 1990 John Wiliey & Sons, Inc.

Ultrahydrophobic and Ultrayophobic Surfaces: Some Comments and Examples, Wei Chen et al., The ACS Journal of Surfaces and Colloids, May 11, 1999, vol. 15, No. 10, pp. 3395-3399, Polymer Science and Engineering Dept., Univ. of MA, Amherst, MA 01003.

Super-Repellent Composite Fluoropolymer Surfaces, S.R. Coulson, I. Woodward, J.P.S. Badyal, The Journal of Physical Chemistry B, vol. 104, No. 37, Sep. 21, 2000, pp. 8836-8840, Dept. of Chemistry, Science Laboratories, Durham University, Durham, DH1 3LE, England, U.K.

Transformation of a Simple Plastic into a Superhydrophobic Surface, H. Yildirim Erbil et al., Science vol. 299, Feb. 28, 2003, pp. 1377-1380.

Bahadur, Pratap, "Block copolymers- Their microdomain formation (in solid state) and surfactant behaviour (in solution)", Current Science, vol. 80, No. 8, pp. 1002-1007, Apr. 25, 2001.

Guo, Andrew et al., "Star Polymers and Nanospheres from Cross-Linkable Diblock Copolymers", Macromolecules, vol. 29, pp. 2487-2493, Jan. 17, 1996.

Ishizu, Koji et al., "Core-Shell Type Polymer Microspheres Prepared from Block Copolymers", Journal of Polymer Science: Part C: Polymer Letters, vol. 26, pp. 281-286, 1988.

Ishizu, Koji, "Synthesis and Structural Ordering of Core-Shell Polymer Microspheres", Prog. Polym. Sci., vol. 23, pp. 1383-1408, 1998.

O'Reilly, Rachel K. et al., "Cross-linked block copolymer micelles: functional nanostructures of great potential and versatility", Chem. Soc. Rev., vol. 35, pp. 1068-1083, Oct. 2, 2006.

Oranli, Levent et al., "Hydrodynamic studies on micellar solutions of styrene-butadiene block copolymers in selective solvents", Can. J. Chem., vol. 63, pp. 2691-2696, 1985.

Pispas, S. et al., "Effect of Architecture on the Micellization Properties of Block Copolymers: $A_2B$ Miktoarm Stars vs AB Diblocks", Macromolecules, vol. 33, pp. 1741-1746, Feb. 17, 2000.

Riess, Gerard, "Micellization of block copolymers", Prog. Polym. Sci., vol. 28, pp. 1107-1170, Jan. 16, 2003.

Saito, Reiko et al., "Synthesis of microspheres with 'hairy-ball' structures from poly (styrene-b-2-vinyl pyridine) diblock copolymers", Polymer, vol. 33, No. 5, pp. 1073-1077, 1992.

Thurmond, K. Bruce et al., "Shell cross-linked polymer micelles: stabilized assemblies with great versatility and potential", Colloids and Surfaces B: Biointerfaces, vol. 16, pp. 45-54, 1999.

Wilson, D.J. et al., "Photochemical Stabilization of Block Copolymer Micelles", Eur. Polym. J., vol. 24, No. 7, pp. 617-621, 1988.

Ege, Seyhan, Organic Chemistry Structure and Reactivity, 3rd Edition, p. 959, 1994.

Oct. 20, 2005 Office Action from U.S. Appl. No. 11/104,759, filed Apr. 13, 2005 (12 pp.).

Aug. 21, 2006 Final Office Action from U.S. Appl. No. 11/104,759, filed Apr. 13, 2005 (14 pp.).

Dec. 22, 2006 Advisory Action from U.S. Appl. No. 11/104,759, filed Apr. 13, 2005 (3 pp.).

May 16, 2007 Office Action from U.S. Appl. No. 11/104,759, filed Apr. 13, 2005 (9 pp.).

Oct. 30, 2007 Final Office Action from U.S. Appl. No. 11/104,759, filed Apr. 13, 2005 (11 pp.).

Reaction of Primary Aliphatic Amines with Maleic Anhydride, Lester E. Coleman et al., J. Org,. Chem., 24, 185, 1959, pp. 135-136.

Synthesis, Thermal Properties and Gas Permeability of Poly (N-n-alkylmaleimide)s, A. Matsumoto et al., Polymer Journal vol. 23, No. 3, 1991, pp. 201-209.

Simultaneous TA and MS Analysis of Alternating Styrene-Malei Anhydride and Styrene-Maleimide Copolymers, Thermochim. Acta, 277, 14, 1996.

Synthesis and Photocrosslinking of Maleimide-Type Polymers, Woo-Sik Kim et al., Macromol. Rapid Commun., 17, 835, 1996, pp. 835-841.

Polysulfobetaines and Corresponding Cationic Polymers. IV. Synthesis and Aqueous Solution Properties of Cationic Poly (MIQSDMAPM), Wen-Fu Lee et al., J. Appl. Pol. Sci. vol. 59, 1996, pp. 599-608.

Chemical Modification of Poly (styrene-co-maleic anhydride) with Primary N-Alkylamines by Reactive Extrusion, I Vermeesch et al., J. Applied Polym. Sci., vol. 53, 1994, pp. 1365-1373.

Vulcanization Agents and Auxiliary Materials, Kirk-Othmer, Encyclopedia of Chemical Technology, 3rd Ed., Wiley Interscience, NY, 1982, vol. 22, pp. 390-403.

Dialkylimidazolium Chloroaluminate Melts: A New Class of Room-Temperature Ionic Liquids for Electrochemistry, Spectroscopy, and Synthesis. J.S. Wilkes, J.A. Levisky, B.A. Wilson, Inorg. Chem. 1982, 21, pp. 1263-1264.

Polymer-m-Ionic-Liquid Electrolytes C. Tiyapiboonchaiya, D.R. MacFarlane, J. Sun, M. Forsyth, Micromol. Chem. Phys., 2002, 203, pp. 1906-1911.

EXAFS Investigations of the Mechanism of Facilitated Ion Transfer into a Room-Temperature Ionic Liquid. M. Jensen, J.A. Dzielawa, P. Rickert, M.L. Dietz, Jacs, 2002, 124, pp. 10664-10665.

Structure of molten 1,3-dimethylimidazolium chloride using neutron diffraction.C. Hardacre, J.D. Holbrey, S.E. J. McMath, D.T. Bowron, A.K. Soper, J. Chem. Physics, 2003, 118(1), pp. 273-278.

Reverse Atom Transfer Radical Polymerization of Methyl Methacrylate in Room-Temperature Inoic Liqquids, H. Ma, X. Wan, X. Chen, Q-F. Zhou, J. Polym. Sci., A. Polym. Chem. 2003, 41, pp. 143-151.

Non-Debye Relaxations in Disordered Ionic Solids, W. Dieterich, P. Maass, Chem. Chys. 2002, 284, pp. 439-467.

Polymer Layered Silicate Nanocomposites, Giannelis E.P. Advanced Materials vol. 8, No. 1, Jan. 1, 1996, pp. 29-35.

A Review of Nanocomposites 2000, J.N. Hay, S. J. Shaw.

Recent Advances in Flame Retardant Polymer Nanocomposites, Tilman, J.W. et al., pp. 273-283.

"Dendrimers and Dendrons, Concept, Synthesis, Application", edited by Newkome G.R, Wiley-VCH, 2001, pp. 45, 191-310.

"Synthesis, Functionalization and Surface Treatment of Nanoparticles", edited by Baraton M-I, ASP (Am. Sci. Pub.), Stevenson Ranch, California, 2003, pp. 51-52, 174-208.

Borukhov, Itamar et al., "Enthalpic Stabilization of Brush-Coated Particles in a Polymer Melt", Macromolecules, vol. 35, pp. 5171-5182 (2002).

Braun, Hartmut et al., "Enthalpic interaction of diblock copolymers with immiscible polymer blend components", Polymer Bulletin, vol. 32, pp. 241-248 (1994).

Brown, H.R. et al., "Communications to the Editor: Enthalpy-Driven Swelling of a Polymer Brush", Macromolecules, vol. 23, pp. 3383-3385 (1990).

Cahn, John W., "Phase Separation by Spinodal Decomposition in Isotropic Systems", The Journal of Chemical Physics, vol. 42, No. 1, pp. 93-99 (Jan. 1, 1965).

Chen, Ming-Qing et al., "Nanosphere Formation in Copolymerization of Methyl Methacrylate with Poly(ethylene glycol) Macromonomers", Journal of Polymer Science: Part A: Polymer Chemistry, vol. 38, pp. 1811-1817 (2000).

Ferreira, Paula G. et al., "Scaling Law for Entropic Effects at Interfaces between Grafted Layers and Polymer Melts", Macromolecules, vol. 31, pp. 3994-4003 (1998).

Gay, C., "Wetting of a Polymer Brush by a Chemically Identical Polymer Melt", Macromolecules, vol. 30, pp. 5939-5943 (1997).

Halperin, A., "Polymeric Micelles: A Star Model", Macromolecules, vol. 20, pp. 2943-2946 (1987).

Hasegawa, Ryuichi et al., "Optimum Graft Density for Dispersing Particles in Polymer Melts", Macromolecules, vol. 29, pp. 6656-6662 (1996).

Kraus, Gerard, "Mechanical Losses in Carbon-Black-Filled Rubbers", Journal of Applied Polymer Science: Applied Polymer Symposium, vol. 39, pp. 75-92 (1984).

Ligoure, Christian, "Adhesion between a Polymer Brush and an Elastomer: A Self-Consistent Mean Field Model", Macromolecules, vol. 29, pp. 5459-5468 (1996).

Matsen, M.W., "Phase Behavior of Block Copolymer/Homopolymer Blends", Macromolecules, vol. 28, pp. 5765-5773 (1995).

Milner, S.T. et al., "Theory of the Grafted Polymer Brush", Macromolecules, vol. 21, pp. 2610-2619 (1988).

Milner, S.T. et al., "End-Confined Polymers: Corrections to the Newtonian Limit", Macromolecules, vol. 22, pp. 489-490 (1989).

Noolandi, Jaan et al., "Theory of Block Copolymer Micelles in Solution", Macromolecules, vol. 16, pp. 1443-1448 (1983).

Semenov, A.N., "Theory of Diblock-Copolymer Segregation to the Interface and Free Surface of a Homopolymer Layer", Macromolecules, vol. 25, pp. 4967-4977 (1992).

Semenov, A.N., "Phase Equilibria in Block Copolymer-Homopolymer Mixtures", Macromolecules, vol. 26, pp. 2273-2281 (1993).

Shull, Kenneth R., "End-Adsorbed Polymer Brushes in High- and Low-Molecular-Weight Matrices", Macromolecules, vol. 29, pp. 2659-2666 (1996).

Whitmore, Mark Douglas et al., "Theory of Micelle Formation in Block Copolymer-Homopolymer Blends", Macromolecules, vol. 18, pp. 657-665 (1985).

Wijmans, C.M. et al., "Effect of Free Polymer on the Structure of a Polymer Brush and Interaction between Two Polymer Brushes", Macromolecules, vol. 27, pp. 3238-3248 (1994).

Witten, T.A. et al., "Stress Relaxation in the Lamellar Copolymer Mesophase", Macromolecules, vol. 23, pp. 824-829 (1990).

Worsfold, Denis J. et al., "Preparation et caracterisation de polymeres-modele a structure en etoile, par copolymerisation sequencee anionique", Canadian Journal of Chemistry, vol. 47, pp. 3379-3385 (Mar. 20, 1969).

Ishizu, Koji et al., "Core-Shell Type Polymer Microspheres Prepared by Domain Fixing of Block Copolymer Films", Journal of Polymer Science: Part A: Polymer Chemistry, vol. 27, pp. 3721-3731 (1989).

Ishizu, Koji et al. "Preparation of core-shell type polymer microspheres from anionic block copolymers", Polymer, vol. 34, No. 18, pp. 3929-3933 (1993).

Saito, Reiko et al., "Core-Shell Type Polymer Microspheres Prepared From Poly(Styrene-b-Methacrylic Acid)—1. Synthesis of Microgel", Eur. Polym. J., vol. 27, No. 10, pp. 1153-1159(1991).

Saito, Reiko et al., "Arm-number effect of core-shell type polymer microsphere: 1. Control of arm-number of microsphere", Polymer, vol. 35, No. 4, pp. 866-871 (1994).

Kralik, M. et al., "Catalysis by metal nanoparticles supported on functional organic polymers", Journal of Molecular Catalysis A: Chemical, vol. 177, pp. 113-138 [2001].

Wang, Xiaorong et al., U.S. Appl. No. 10/791,049, filed Mar. 2, 2004 entitled "Method of Making Nano-Particles Of Selected Size Distribution".

Wang, Xiaorong et al., U.S. Appl. No. 10/791,177, filed Mar. 2, 2004 entitled "Rubber Composition Containing Functionalized Polymer Nanoparticles".

Wang, Xiaorong et al., U.S. Appl. No. 10/872,731, filed Jun. 21, 2004 entitled "Reversible Polymer/Metal Nano-Composites And Method For Manufacturing Same".

Wang, Xiaorong et al., U.S. Appl. No. 10/886,283, filed Jul. 6, 2004 entitled "Hydropobic Surfaces with Nanoparticles".

Wang, Xiaorong et al., U.S. Appl. No. 11/058,156, filed Feb. 15, 2005 entitled "Multi-Layer Nano-Particle Preparation And Applications".

Wang, Xiaorong et al., U.S. Appl. No. 11/104,759, filed Apr. 13, 2005 entitled "Nano-Particle Preparation and Applications".

Bohm, Georg G.A. et al., U.S. Appl. No. 11/117,981, filed Apr. 29, 2005 entitled "Self Assembly Of Molecules To Form Nano-Particle".

Wang, Xiaorong et al., U.S. Appl. No. 11/305,279, filed Dec. 16, 2005 entitled "Combined Use Of Liquid Polymer And Polymeric Nanoparticles For Rubber Applications".

Wang, Xiaorong et al., U.S. Appl. No. 11/344,861, filed Feb. 1, 2006 entitled "Nano-Composite And Compositions Therefrom".

Wang, Xiaorong et al., U.S. Appl. No. 11/642,796, filed Dec. 20, 2006 entitled "Hollow Nano-Particles And Method Thereof".

Wang, Xiaorong et al., U.S. Appl. No. 11/764,607, filed Jun. 18, 2007 entitled "Multi-Layer Nano-Particle Preparation and Applications".

Warren, Sandra, U.S. Appl. No. 11/771,659, filed Jun. 29, 2007 entitled "One-Pot Synthesis Of Nanoparticles And Liquid Polymer For Rubber Applications".

Wang, Xiaorong et al., U.S. Appl. No. 11/941,128, filed Nov. 16, 2007 entitled "Nano-Particle Preparation And Applications".

Wang, Xiaorong et al., U.S. Appl. No. 11/954,268, filed Dec. 12, 2007 entitled "Nanoporous Polymeric Material And Preparation Method".

Wang, Xiaorong et al., U.S. Appl. No. 12/047,896, filed Mar. 13, 2008 entitled "Reversible Polymer/Metal Nano-Composites And Method For Manufacturing Same".

Wang, Xiaorong et al., U.S. Appl. No. 12/184,895, filed Aug. 1, 2008 entitled "Disk-Like Nanoparticles".

Lipman, Bernard, Notice of Allowance dated Jan. 14, 2009 from U.S. Appl. No. 11/058,156 (5 pp.).

Harlan, Robert D., Office Action dated Jan. 9, 2009 from U.S. Appl. No. 11/117,981 (6 pp.).

Cain, Edward J., Notice of Allowance dated Dec. 31, 2008 from U.S. Appl. No. 11/642,124 (5 pp.).

Lipman, Bernard, Mar. 26, 2002 Notice of Allowance from U.S. Appl. No. 09/970,830, filed Oct. 4, 2001 (4 pp.).

Kiliman, Leszek B., Feb. 13, 2003 Office from U.S. Appl. No. 10/038,748, filed Dec. 31, 2001 (3 pp.).

Kiliman, Leszak B., Aug. 25, 2003 Notice of Allowance from U.S. Appl. No. 10/038,748, filed Dec. 31, 2001 (5 pp.).

Harlan, Robert D., Mar. 17, 2004 Restriction/Election Office Action from U.S. Appl. No. 10/223,393, filed Aug. 19, 2002 (6 pp.).

Harlan, Robert D., Jun. 22, 2004 Office Action from U.S. Appl. No. 10/223,393, filed Aug. 19, 2002 (6 pp.).

Harlan, Robert D., Jan. 3, 2005 Notice of Allowance from U.S. Appl. No. 10/223,393, filed Aug. 19, 2002 (6 pp.).

Lipman, Bernard, Mar. 25, 2004 Restriction/Election Office Action from U.S. Appl. No. 10/331,841, filed Dec. 30, 2002 (6 pp.).

Lipman, Bernard, Nov. 18, 2004 Notice of Allowance from U.S. Appl. No. 10/331,841, filed Dec. 30, 2002 (5 pp.).

Lipman, Bernard, Mar. 24, 2004 Restriction/Election Office Action from U.S. Appl. No. 10/345,498, filed Jan. 16, 2003 (5 pp.).

Lipman, Bernard, Nov. 23, 2004 Notice of Allowance from U.S. Appl. No. 10/345,498, filed Jan. 16, 2003 (5 pp.).

Choi, Ling Siu, Mar. 24, 2006 Office Action from U.S. Appl. No. 10/755,648, filed Jan. 12, 2004 (11 pp.).

Choi, Ling Siu, Dec. 4, 2006 Notice of Allowance from U.S. Appl. No. 10/755,648, filed Jan. 12, 2004 (9 pp.).

Asinovsky, Olga, Aug. 16, 2007 Advisory Action from U.S. Appl. No. 10/791,049, filed Mar. 2, 2004 (2 pp.).

Asinovsky, Olga, Jul. 29, 2008 Advisory Action from U.S. Appl. No. 10/791,049, filed Mar. 2, 2004 (3 pp.).

Harlan, Robert D., Jan. 9, 2008 Advisory Action from U.S. Appl. No. 10/791,177, filed Mar. 2, 2004 (3 pp.).

Harlan, Robert D., Mar. 7, 2008 Advisory Action from U.S. Appl. No. 10/791,177, filed Mar. 2, 2004 (3 pp.).

Le, Hoa T., Dec. 14, 2004 Office Action from U.S. Appl. No. 10/791,491, filed Mar. 2, 2004 (5 pp.).

Le, Hoa T., Jul. 5, 2005 Office Action from U.S. Appl. No. 10/791,491, filed Mar. 2, 2004 (9 pp.).

Le, Hoa T., Apr. 10, 2006 Notice of Allowance from U.S. Appl. No. 10/791,491, filed Mar. 2, 2004 (5 pp.).

Kiliman, Leszak B., May 15, 2007 Advisory Action from U.S. Appl. No: 10/817,995, filed Apr. 5, 2004 (2 pp.).

Kiliman, Leszak B., Apr. 2, 2008 Notice of Allowance from U.S. Appl. No. 10/817,995, filed Apr. 5, 2004 (5 pp.).

Lipman, Bernard, May 21, 2007 Notice of Allowance from U.S. Appl. No. 11/058,156, filed Feb. 15, 2005 (3 pp.).

Lipman, Bernard, Aug. 28, 2007 Notice of Allowance from U.S. Appl. No. 11/058,156, filed Feb. 15, 2005 (5 pp.).

Lipman, Bernard, Feb. 28, 2008 Notice of Allowance from U.S. Appl. No. 11/058,156, filed Feb. 15, 2005 (5 pp.).

Lipman, Bernard, May 29, 2008 Notice of Allowance from U.S. Appl. No. 11/058,156, filed Feb. 15, 2005 (5 pp.).

Lipman, Bernard, Oct. 3, 2006 Notice of Allowance from U.S. Appl. No. 11/064,234, filed Feb. 22, 2005 (5 pp.).

Haider, Saira Bano, Dec. 22, 2006 Advisory Action from U.S. Appl. No. 11/104,759, filed Apr. 13, 2005 (3 pp.).

Haider, Saira Bano, Mar. 19, 2008 Advisory Action from U.S. Appl. No. 11/104,759, filed Apr. 13, 2005 (3 pp.).

Haider, Saira Bano, Dec. 2, 2008 Office Action from U.S. Appl. No. 11/104,759, filed Apr. 13, 2005 (10 pp.).

Lipman, Bernard, Sep. 14, 2006 Office Action from U.S. Appl. No. 11/168,297, filed Jun. 29, 2005 (4 pp.).

Lipman, Bernard, Mar. 2, 2007 Notice of Allowance from U.S. Appl. No. 11/168,297, filed Jun. 29, 2005 (3 pp.).

Lipman, Bernard, Apr. 18, 2007 Supplemental Notice of Allowability from U.S. Appl. No. 11/168,297, filed Jun. 29, 2005 (3 pp.).

Lipman, Bernard, Mar. 20, 2008 Office Action from U.S. Appl. No. 11/764,607, filed Jun. 18, 2007 (4 pp.).

Lipman, Bernard, Sep. 25, 2008 Notice of Allowance from U.S. Appl. No. 11/764,607, filed Jun. 18, 2007 (3 pp.).

Russell, Graham, Nov. 4, 2008 Office Action from European Patent Application No. 05742316.2 filed Mar. 28, 2005 (2 pp.).

Schutte, M., Nov. 13, 2003 International Search Report from PCT Patent Application No. PCT/US02/31817 filed Oct. 4, 2002 (3 pp.).

Schutte, M., May 28, 2004 International Search Report from PCT Patent Application No. PCT/US03/40375 filed Dec. 18, 2003 (3 pp.).

Iraegui Retolaza, E., Jul. 9, 2004 International Search Report from PCT Patent Application No. PCT/US2004/001000 filed Jan. 15, 2004 (3 pp.).

Russell, G., Aug. 1, 2005 International Search Report from PCT Patent Application No. PCT/US2005/010352 filed Mar. 28, 2005 (3 pp.).

Mettler, Rolf-Martin, May 27, 2008 International Search Report from PCT Patent Application No. PCT/US2007/087869 filed Dec. 18, 2007 (2 pp.).

Iraegui Retolaza, E., May 30, 2008 International Search Report from PCT Patent Application No. PCT/US2007/026031 filed Dec. 19, 2007 (3 pp.).

Sakurai, Ryo et al., "68.2: Color and Flexible Electronic Paper Display using QR-LPD Technology", SID 06 Digest, pp. 1922-1925 (2006).

Asinovsky, Olga, Jun. 20, 2006 Office Action from U.S. Appl. No. 10/791,049, filed Mar. 2, 2004 (11 pp.).

Asinovsky, Olga, Dec. 22, 2006 Office Action from U.S. Appl. No. 10/791,049, filed Mar. 2, 2004 (11 pp.).

Asinovsky, Olga, Jun. 7, 2007 Office Action from U.S. Appl. No. 10/791,049, filed Mar. 2, 2004 (11 pp.).

Asinovsky, Olga, Nov. 28, 2007 Office Action from U.S. Appl. No. 10/791,049, filed Mar. 2, 2004 (9 pp.).

Asinovsky, Olga, May 21, 2008 Office Action from U.S. Appl. No. 10/791,049, filed Mar. 2, 2004 (11 pp.).

Asinovsky, Olga, Sep. 11, 2008 Office Action from U.S. Appl. No. 10/791,049, filed Mar. 2, 2004 (12 pp.).

Ronesi, Vickey M., Jan. 8, 2007 Office Action from U.S. Appl. No. 10/791,177, filed Mar. 2, 2004 (5 pp.).
Harlan, Robert D., May 3, 2007 Office Action from U.S. Appl. No. 10/791,177, filed Mar. 2, 2004 (6 pp.).
Harlan, Robert D., Oct. 18, 2007 Office Action from U.S. Appl. No. 10/791,177, filed Mar. 2, 2004 (6 pp.).
Harlan, Robert D., May 28, 2008 Office Action from U.S. Appl. No. 10/791,177, filed Mar. 2, 2004 (8 pp.).
Kiliman, Leszek B., Sep. 9, 2005 Office Action from U.S. Appl. No. 10/817,995, filed Apr. 5, 2004 (7 pp.).
Kiliman, Leszek B., Mar. 23, 2006 Office Action from U.S. Appl. No. 10/817,995, filed Apr. 5, 2004 (7 pp.).
Kiliman, Leszek B., Dec. 13, 2006 Office Action from U.S. Appl. No. 10/817,995, filed Apr. 5, 2004 (6 pp.).
Kiliman, Leszek B., Sep. 5, 2008 Office Action from U.S. Appl. No. 10/817,995, filed Apr. 5, 2004 (5 pp.).
Wyrozebski Lee, Katarzyna I., Dec. 19, 2006 Office Action from U.S. Appl. No. 10/872,731, filed Jun. 21, 2004 (6 pp.).
Wyrozebski Lee, Katarzyna I., Mar. 7, 2007 Office Action from U.S. Appl. No. 10/872,731, filed Jun. 21, 2004 (13 pp.).
Wyrozebski Lee, Katarzyna I., Sep. 14, 2007 Office Action from U.S. Appl. No. 10/872,731, filed Jun. 21, 2004 (9 pp.).
Chevalier, Alicia Ann, Sep. 6, 2006 Office Action from U.S. Appl. No. 10/886,283, filed Jul. 6, 2004 (5 pp.).
Chevalier, Alicia Ann, Jan. 4, 2007 Office Action from U.S. Appl. No. 10/886,283, filed Jul. 6, 2004 (8 pp.).
Chevalier, Alicia Ann, Jul. 2, 2007 Office Action from U.S. Appl. No. 10/886,283, filed Jul. 6, 2004 (8 pp.).
Chevalier, Alicia Ann, Jan. 4, 2008 Office Action from U.S. Appl. No. 10/886,283, filed Jul. 6, 2004 (8 pp.).
Lipman, Bernard., Sep. 29, 2006 Office Action from U.S. Appl. No. 11/058,156, filed Feb. 15, 2005 (5 pp.).
Ram, Saira B., Oct. 20, 2005 Office Action from U.S. Appl. No. 11/104,759, filed Apr. 13, 2005 (10 pp.).
Raza, Saira B., Aug. 21, 2006 Office Action from U.S. Appl. No. 11/104,759, filed Apr. 13, 2005 (6 pp.).
Haider, Saira Bano, May 16, 2007 Office Action from U.S. Appl. No. 11/104,759, filed Apr. 13, 2005 (9 pp.).
Haider, Saira Bano, Oct. 30, 2007 Office Action from U.S. Appl. No. 11/104,759, filed Apr. 13, 2005 (9 pp.).
Haider, Saira Bano, Jun. 12, 2008 Office Action from U.S. Appl. No. 11/104,759, filed Apr. 13, 2005 (10 pp.).
Harlan, Robert D., Nov. 7, 2005 Office Action from U.S. Appl. No. 11/117,981, filed Apr. 29, 2005 (7 pp.).
Harlan, Robert D., Jul. 20, 2006 Office Action from U.S. Appl. No. 11/117,981, filed Apr. 29, 2005 (6 pp.).
Harlan, Robert D., Jan. 26, 2007 Office Action from U.S. Appl. No. 11/117,981, filed Apr. 29, 2005 (8 pp.).
Harlan, Robert D., Jul. 12, 2007 Office Action from U.S. Appl. No. 11/117,981, filed Apr. 29, 2005 (6 pp.).
Harlan, Robert D., Jan. 2, 2008 Office Action from U.S. Appl. No. 11/117,981, filed Apr. 29, 2005 (6 pp.).
Harlan, Robert D., Jul. 25, 2008 Office Action from U.S. Appl. No. 11/117,981, filed Apr. 29, 2005 (8 pp.).
Maksymonko, John M., Feb. 20, 2008 Office Action from U.S. Appl. No. 11/305,279, filed Dec. 16, 2005 (14 pp.).
Maksymonko, John M., Aug. 6, 2008 Office Action from U.S. Appl. No. 11/305,279, filed Dec. 16, 2005 (11 pp.).
Maksymonko, John M., Jul. 17, 2008 Office Action from U.S. Appl. No. 11/305,281, filed Dec. 16, 2005 (13 pp.).
Le, Hoa T., Sep. 25, 2008 Office Action from U.S. Appl. No. 11/612,554, filed Dec. 19, 2006 (8 pp.).
Maksymonko, John M., Jun. 13, 2008 Office Action from U.S. Appl. No. 11/641,514, filed Dec. 19, 2006 (7 pp.).
Mullis, Jeffrey C., Oct. 31, 2008 Office Action from U.S. Appl. No. 11/641,514, filed Dec. 19, 2006 (10 pp.).
Maksymonko, John M., Jun. 11, 2008 Office Action from U.S. Appl. No. 11/642,124, filed Dec. 20, 2006 (16 pp.).
Maksymonko, John M., May 30, 2008 Office Action from U.S. Appl. No. 11/642,795, filed Dec. 20, 2006 (12 pp.).
Maksymonko, John M., May 28, 2008 Office Action from U.S. Appl. No. 11/642,802, filed Dec. 20, 2006 (10 pp.).

Chen, Jizhuang, Dec. 30, 2005 Office Action from Chinese Patent Application No. 02819527.2 filed Oct. 4, 2002 (9 pp.).
Chen, Jizhuang, Dec. 21, 2007 Office Action from Chinese Patent Application No. 02819527.2 filed Oct. 4, 2002 (12 pp.).
Chen, Jizhuang, Sep. 26, 2008 Office Action from Chinese Patent Application No. 02819527.2 filed Oct. 4, 2002 (4 pp.).
Schutte, M., Aug. 8, 2006 Office Action from European Patent Application No. 02807196.7 filed Oct. 4, 2002 (5 pp.).
Schutte, Maya, Sep. 3, 2007 Office Action from European Patent Application No. 02807196.7 filed Oct. 4, 2002 (2 pp.).
Watanabe, Y., May 7, 2008 Office Action from Japanese Patent Application No. 582224/2003 filed Oct. 4, 2002 (5 pp.).
Watanabe, Y., Jul. 29, 2008 Office Action from Japanese Patent Application No. 582224/2003 filed Oct. 4, 2002 (17 pp.).
May 30, 2008 International Search Report from PCT Patent Application No. PCT/US2007/026031 filed Dec. 19, 2007 (4 pp.).
May 27, 2008 International Search Report from PCT Patent Application No. PCT/US2007/087869 filed Dec. 18, 2007 (4 pp.).
Aug. 25, 2008 International Search Report from PCT Patent Application No. PCT/US2008/068838 filed Jun. 30, 2008 (4 pp.).
Bohm, Georg et al., "Emerging materials: technology for new tires and other rubber products", Tire Technology International, 2006 (4 pp.).
Cui, Honggang et al., "Block Copolymer Assembly via Kinetic Control", Science, vol. 317, pp. 647-650 (Aug. 3, 2007).
Edmonds, William F. et al., "Disk Micelles from Nonionic Coil- Coil Diblock Copolymers", Macromolecules, vol. 39, pp. 4526-4530 (May 28, 2006).
O'Reilly, Rachel K. et al., "Functionalization of Micelles and Shell Cross-linked Nanoparticles Using Click Chemistry", Chem. Mater., vol. 17, No. 24, pp. 5976-5988 (Nov. 24, 2005).
Wang, Xiaorong et al., "Strain-induced nonlinearity of filled rubbers", Physical Review E 72, 031406, pp. 1-9 (Sep. 20, 2005).
Pre-print article, Wang, Xiaorong et al., "PMSE 392- Manufacture and Commercial Uses of Polymeric Nanoparticles", Division of Polymeric Materials: Science and Engineering (Mar. 2006).
Wang, Xiaorong et al., "Manufacture and Commercial Uses of Polymeric Nanoparticles", Polymeric Materials: Science and Engineering, vol. 94, p. 659 (2006).
Wang, Xr. et al., "Fluctuations and critical phenomena of a filled elastomer under deformation", Europhysics Letters, vol. 75, No. 4, pp. 590-596 (Aug. 15, 2006).
Wang, Xiaorong et al., "Under microscopes the poly(styrene/butadiene) nanoparticles", Journal of Electron Microscopy, vol. 56, No. 6, pp. 209-216 (2007).
Wang, Xiaorong et al., "Heterogeneity of structural relaxation in a particle-suspension system", EPL, 79, 18001, pp. 1-5 (Jul. 2007).
Bridgestone Americas 2006 Presentation (14 pp.).
Harlan, Robert D. Final Office Action dated Dec. 10, 2008 from U.S. Appl. No. 10/791,177 (8 pp.).
Cain, Edward J., Final Office Action dated Dec. 9, 2008 from U.S. Appl. No. 11/642,795 (6 pp.).
Mulcahy, Peter D., Restriction/Election Office Action dated Dec. 11, 2008 from U.S. Appl. No. 11/642,802 (7 pp.).
Akashi, Mitsuru et al., "Synthesis and Polymerization of a Styryl Terminated Oligovinylpyrrolidone Macromonomer", Die Angewandte Makromolekulare Chemie, 132, pp. 81-89 (1985).
Alexandridis, Paschalis et al., "Amphiphilic Block Copolymers: Self-Assembly and Applications", Elsevier Science B.V., pp. 1-435 (2000).
Allgaier, Jurgen et al., "Synthesis and Micellar Properties of PS-PI Block Copolymers of Different Architecture", ACS Polym. Prepr. (Div Polym. Chem.), vol. 37, No. 2, pp. 670-671 (1996).
Antonietti, Markus et al., "Determination of the Micelle Architecture of Polystyrene/Poly(4-vinylpyridine) Block Copolymers in Dilute Solution", Macromolecules, 27, pp. 3276-3281 (1994).
Antonietti, Markus et al., "Novel Amphiphilic Block Copolymers by Polymer Reactions and Their Use for Solubilization of Metal Salts and Metal Colloids", Macromolecules, 29, pp. 3800-3806 (1996).
Batzilla, Thomas et al., "Formation of intra- and intermolecular crosslinks in the radical crosslinking of poly(4-vinylstyrene)", Makromol. Chem., Rapid Commun. 8, pp. 261-268 (1987).

Bauer, B.J. et al., "Synthesis and Dilute-Solution Behavior of Model Star-Branched Polymers", Rubber Chemistry and Technology, vol. 51, pp. 406-436 (1978).

Berger, G. et al., "Mutual Termination of Anionic and Cationic 'Living' Polymers", Polymer Letters, vol. 4, pp. 183-186 (1966).

Bradley, John S., "The Chemistry of Transition Metal Colloids", Clusters and Colloids: From Theory to Applications, Chapter 6, Weinheim, VCH, pp. 459-544 (1994).

Bronstein, Lyudmila M. et al., "Synthesis of Pd-, Pt-, and Rh-containing polymers derived from polystyrene-polybutadiene block copolymers; micellization of diblock copolymers due to complexation", Macromol. Chem. Phys., 199, pp. 1357-1363 (1998).

Calderara, Frederic et al., "Synthesis of chromophore-labelled polystyrene/poly(ethylene oxide) diblock copolymers", Makromol. Chem., 194, pp. 1411-1420 (1993).

Chen, Ming-Qing et al., "Graft Copolymers Having Hydrophobic Backbone and Hydrophilic Branches. XXIII. Particle Size Control of Poly(ethylene glycol)- Coated Polystyrene Nanoparticles Prepared by Macromonomer Method", Journal of Polymer Science: Part A: Polymer Chemistry, vol. 37, pp. 2155-2166 (1999).

Eisenberg, Adi, "Thermodynamics, Kinetics, and Mechanisms of the Formation of Multiple Block Copolymer Morphologies", Polymer Preprints, vol. 41, No. 2, pp. 1515-1516 (2000).

Erhardt, Rainer et al., Macromolecules, vol. 34, No. 4, pp. 1069-1075 (2001).

Eschwey, Helmut et al., "Preparation and Some Properties of Star-Shaped Polymers with more than Hundred Side Chains", Die Makromolekulare Chemie 173, pp. 235-239 (1973).

Eschwey, Helmut et al., "Star polymers from styrene and divinylbenzene", Polymer, vol. 16, pp. 180-184 (Mar. 1975).

Fendler, Janos H., "Nanoparticles and Nanostructured Films: Preparation, Characterization and Applications", Wiley-VCH, pp. 1-468 (1998).

Garcia, Carlos B. et al., "Self-Assembly Approach toward Magnetic Silica-Type Nanoparticles of Different Shapes from Reverse Block Copolymer Mesophases", J. Am. Chem. Soc., vol. 125, pp. 13310-13311 (2003).

Hamley, Ian W., "The Physics of Block Copolymers", Oxford Science Publication: Oxford, Chapters 3 and 4, pp. 131-265, (1998).

Ishizu, Koji et al., "Synthesis of Star Polymer with Nucleus of Microgel", Polymer Journal, vol. 12, No. 6, pp. 399-404 (1980).

Ishizu, Koji, "Structural Ordering of Core Crosslinked Nanoparticles and Architecture of Polymeric Superstructures", ACS Polym. Prepr. (Div Polym Chem) vol. 40, No. 1, pp. 456-457 (1999).

Liu, Guojun et al., "Diblock Copolymer Nanofibers", Macromolecules, 29, pp. 5508-5510 (1996).

Liu, T. et al., "Formation of Amphiphilic Block Copolymer Micelles in Nonaqueous Solution", Amphiphilic Block Copolymers: Self-Assembly and Applications, Elsevier Science B.V., pp. 115-149 (2000).

Ma, Qinggao et al., "Entirely Hydrophilic Shell Cross-Linked Knedel-Like (SCK) Nanoparticles", Polymer Preprints, vol. 41, No. 2, pp. 1571-1572 (2000).

Mayer, A.B.R. et al., "Transition metal nanoparticles protected by amphiphilic block copolymers as tailored catalyst systems", Colloid Polym. Sci., 275, pp. 333-340 (1997).

Mi, Yongli et al., "Glass transition of nano-sized single chain globules", Polymer 43, Elsevier Science Ltd., pp. 6701-6705 (2002).

Nace, Vaughn M., "Nonionic Surfactants: Polyoxyalkylene Block Copolymers", Surfactant Science Series, vol. 60, pp. 1-266 (1996).

Okay, Oguz et al., "Steric stabilization of reactive microgels from 1,4-divinylbenzene", Makromol. Chem., Rapid Commun., vol. 11, pp. 583-587 (1990).

Okay, Oguz et al., "Anionic Dispersion Polymerization of 1,4-Divinylbenzene", Macromolecules, 23, pp. 2623-2628 (1990).

Piirma, Irja, "Polymeric Surfactants", Surfactant Science Series, vol. 42, pp. 1-289 (1992).

Price, Colin, "Colloidal Properties of Block Copolymers", Applied Science Publishers Ltd., Chapter 2, pp. 39-80 (1982).

Rager, Timo et al., "Micelle formation of poly(acrylic acid)- block-poly(methyl methacrylate) block copolymers in mixtures of water with organic solvents", Macromol. Chem. Phys., 200, No. 7, pp. 1672-1680 (1999).

Rein, David H. et al., "Kinetics of arm-first star polymers formation in a non-polar solvent", Macromol. Chem. Phys., vol. 199, pp. 569-574 (1998).

Rempp, Paul et al., "Grafting and Branching of Polymers", Pure Appl. Chem., vol. 30, pp. 229-238 (1972).

Riess, Gerard et al., "Block Copolymers", Encyclopedia of Polymer Science and Engineering, vol. 2, pp. 324-434 (1985).

Saito, Reiko et al., "Synthesis of Microspheres with Microphase-Separated Shells", Journal of Polymer Science: Part A: Polymer Chemistry, vol. 38, pp. 2091-2097 (2000).

Serizawa, Takeshi et al., "Transmission Electron Microscopic Study of Cross-Sectional Morphologies of Core-Corona Polymeric Nanospheres", Macromolecules, 33, pp. 1759-1764 (2000).

Stepanek, Miroslav et al. "Time-Dependent Behavior of Block Polyelectrolyte Micelles in Aqueous Media Studied by Potentiometric Titrations, QELS and Fluoretry", Langmuir, Vo. 16, No. 6, pp. 2502-2507 (2000).

Thurmond II, K. Bruce et al., "Water-Soluble Knedel-like Structures: The Preparation of Shell-Cross-Linked Small Particles", J. Am. Chem. Soc., vol. 118, pp. 7239-7240 (1996).

Thurmond II, K. Bruce et al., "The Study of Shell Cross-Linked Knedels (SCK), Formation and Application", ACS Polym. Prepr. (Div Polym. Chem.), vol. 38, No. 1, pp. 62-63 (1997).

Tsitsilianis, Constantinos et al., Makromol. Chem. 191, pp. 2319-2328 (1990).

Tuzar, Zdenek et al., "Micelles of Block and Graft Copolymers in Solutions", Surface and Colloid Science, vol. 15, Chapter 1, pp. 1-83 (1993).

Vamvakaki, M. et al., "Synthesis of novel block and statistical methacrylate-based ionomers containing acidic, basic or betaine residues", Polymer, vol. 39, No. 11, pp. 2331-2337 (1998).

van der Maarel, J.R.C. et al., "Salt-Induced Contraction of Polyelectrolyte Diblock Copolymer Micelles", Langmuir, vol. 16, No. 19, pp. 7510-7519 (2000).

Wang, Xiaorong et al., "Chain conformation in two-dimensional dense state", Journal of Chemical Physics, vol. 121, No. 16, pp. 8158-8162 (Oct. 22, 2004).

Wang, Xiaorong et al., "Synthesis, Characterization, and Application of Novel Polymeric Nanoparticles", Macromolecules, 40, pp. 499-508 (2007).

Webber, Stephen E. et al., "Solvents and Self-Organization of Polymers", NATO ASI Series, Series E: Applied Sciences, vol. 327, pp. 1-509 (1996).

Wooley, Karen L, "From Dendrimers to Knedel-like Structures", Chem. Eur. J., 3, No. 9, pp. 1397-1399 (1997).

Wooley, Karen L, "Shell Crosslinked Polymer Assemblies: Nanoscale Constructs Inspired from Biological Systems", Journal of Polymer Science: Part A: Polymer Chemistry, vol. 38, pp. 1397-1407 (2000).

Worsfold, D.J., "Anionic Copolymerization of Styrene with p-Divinylbenzene", Macromolecules, vol. 3, No. 5, pp. 514-517 (Sep.-Oct. 1970).

Zheng, Lei et al., "Polystyrene Nanoparticles with Anionically Polymerized Polybutadiene Brushes", Macromolecules, 37, pp. 9954-9962 (2004).

Zilliox, Jean-Georges et al., "Preparation de Macromolecules a Structure en Etoile, par Copolymerisation Anionique", J. Polymer Sci.: Part C, No. 22, pp. 145-156 (1968).

Lipman, Bernard, Notice of Allowance dated Jan. 27, 2009 from U.S. Appl. No. 11/764,607 (4 pp.).

Johnson, Edward M., International Search Report dated Dec. 12, 2008 from PCT Application No. PCT/US07/74611 (5 pp.).

Wang, Xiaorong et al., U.S. Appl. No. 12/374,883 international filing date Jul. 27, 2007, entitled "Polymeric Core-Shell Nanoparticles with Interphase Region".

Haider, Saira Bano, Mar. 3, 2009 Advisory Action from U.S. Appl. No. 11/104,759 (3 pp.).

Mullis, Jeffrey C., Mar. 11, 2009 Office Action from U.S. Appl. No. 10/791,049 (9 pp.).

Harlan, Robert D., Mar. 11, 2009 Notice of Allowance from U.S. Appl. No. 10/791,177 (8 pp.).

Sykes, Altrev C., Mar. 20, 2009 Office Action from U.S. Appl. No. 11/818,023 (27 pp.).

Pak, Hannah J., Apr. 2, 2009 Office Action from U.S. Appl. No. 11/941,128 (9 pp.).
Harlan, Robert D., Apr. 30, 2009 Office Action from U.S. Appl. No. 11/117,981 (7 pp.).
Mullis, Jeffrey C., Apr. 30, 2009 Final Office Action from U.S. Appl. No. 11/641,514 (11 pp.).
Mulcahy, Peter D., May 13, 2009 Office Action from U.S. Appl. No. 11/642,802 (7 pp.).
Peets, Monique R., May 11, 2009 Restriction/Election Office Action from U.S. Appl. No. 11/697,801 (6 pp.).
Mullis, Jeffrey C., May 19, 2009 Advisory Action from U.S. Appl. No. 10/791,049 (5 pp.).
Zemel, Irina Sopja, Office Action dated May 28, 2009 from U.S. Appl. No. 11/305,279 (7 pp.).
Mullis, Jeffrey C., Jul. 15, 2009 Advisory Action from U.S. Appl. No. 11/641,514 (4 pp.).
Peets, Monique R., Jul. 20, 2009 Office Action from U.S. Appl. No. 11/697,801 (9 pp.).
Sykes, Altrev C., Oct. 16, 2009 Office Action from U.S. Appl. No. 11/818,023 [20 pp.].
Mullis, Jeffrey C., Nov. 9, 2009 Office Action from U.S. Appl. No. 11/641,514 [9 pp.].
Mulcahy, Peter D., Nov. 9, 2009 Final Office Action from U.S. Appl. No. 11/642,802 [6 pp.].
Kiliman, Leszek B., Nov. 13, 2009 Office Action from U.S. Appl. No. 10/817,995 [6 pp.].

* cited by examiner

POLYMER NANO-PARTICLE WITH POLAR CORE AND METHOD FOR MANUFACTURING SAME

BACKGROUND OF THE INVENTION

The present invention is related to nano-particles comprising a shell and a relatively polar core, their preparation, and their industrial applications. More particularly, the shell of the nano-particle comprises a polymer formed from conjugated diene monomers, while the core comprises a polymer formed from vinyl monomers substituted by at least a polar group.

Electrorheological (ER) fluids, alternatively known as electroviscous fluids, electroresponsive fluids, electrorestrictive fluids or jammy fluids, are colloidal dispersions of polymeric particles in a low conductivity continuous medium. When exposed to an external electric field, ER fluids show pronounced changes in flow properties, i.e., from liquid-like to solid-like, with typical response times in the order of milliseconds. This change is reversible as the liquid-like state returns upon removal of the electric field. This capability of ER fluids allows a variety of mechanical systems to use ER fluids to replace standard electromechanical elements which require a rapid response interface between electronic controls and mechanical devices. The technology greatly expands the number of repetitions a mechanical device can perform. Therefore, a continuous and strong interest in industry is to synthesize novel polymer nano-particles useful in ER fluids.

Polymer nano-particles, on the other hand, have attracted increased attention over the past several years in many other fields including tire, information technology, medicine and healthcare, catalysis, combinatorial chemistry, protein supports, magnets, and photonic crystals etc. Nano-particles can be discrete particles uniformly dispersed throughout a host composition. For example, polystyrene microparticles prepared by anionic dispersion polymerization and emulsion polymerization have been used as a reference standard in the calibration of various instruments, in medical research and in medical diagnostic tests.

However, preparation of some polymer nano-particles, e.g., those with a polarized core, is notoriously difficult. For example, even at −78° C., anionic polymerization of 4-vinyl pyridine goes so fast that some negative impacts emerge, such as poor nano-particle formation and difficulty in monitoring the reaction.

Advantageously, the present invention has developed novel nano-particles comprising a shell and a polar core, which are particularly useful in ER fluids, polymeric product, rubber composition, tire product, hard disk drive gasket, matrix composition, information technology, medicine and healthcare, and engine mount etc.

BRIEF DESCRIPTION OF THE INVENTION

As its one aspect, the present invention provides a nano-particle comprising a shell and a core. The shell comprises a polymer formed from at least a first monomer of formula (I):

Formula (I)

in which $R_1$ and $R_2$ are hydrogen, and each of $R_3$, $R_4$, $R_5$, and $R_6$ is independently selected from the group consisting of hydrogen, methyl, ethyl, propyl, and isopropyl. The core comprises a polymer formed from formula (II) monomer:

Formula (II)

in which up to three of $R_7$, $R_8$, $R_9$, and $R_{10}$ are each independently selected from the group consisting of hydrogen, methyl, ethyl, propyl, and isopropyl, and at least one of $R_7$, $R_8$, $R_9$, and $R_{10}$ is a polar group that is more polar than any one of $R_1$, $R_2$, $R_3$, $R_4$, $R_5$, and $R_6$ groups.

As its another aspect, the present invention provides a process for forming the above described nano-particles. The method comprises the steps of: (a) polymerizing the monomers of formula (I) and the monomers of formula (II) in a hydrocarbon solvent to form a diblock copolymer; (b) forming micelles from said diblock copolymer; and (c) adding at least one cross-linking agent to the polymerization mixture to form cross-linked nano-particles from said micelles. In one embodiment of the present invention, the core of said nano-particles is formed from the second monomers, while the shell of said nano-particles is formed from the first monomers.

As its other aspects, the present invention provides novel polymeric product, rubber composition, tire product, hard disk drive gasket, matrix composition, and engine mount etc., in each of which comprises the above described nano-particle generated from the monomers of formulas (I) and (II).

DETAILED DESCRIPTION OF THE INVENTION

According to the present invention, the basic core-shell structure of the polymer nano-particles can be formed by assembling a sufficient number of block polymer chains, such as diblock polymer chains, into a micelle. In one embodiment of the invention, along the chain of the block polymer, polarity of the blocks decreases or increases in a monotonous manner. Taking diblock polymer nano-particles as an example, the nano-particles can be formed from a first monomer and a second monomer, and, relatively speaking, the first monomer is less polar than the second monomer. Depending on specific embodiment, one of the two polymer blocks can be used to construct the shell of the nano-particles, while the other can be used to construct the core. In a preferred embodiment of the present invention, the shell of the polymer nano-particles is formed from a first (less polar) monomer, and the core is formed from a second (more polar) monomer.

Examples suitable to be used as the first monomer include, but are not limited to, various conjugated 1,3-dienes of formula (I) as shown below:

Formula (I)

in which $R_1$ and $R_2$ are hydrogen, and each of $R_3$, $R_4$, $R_5$, and $R_6$ is independently selected from the group consisting of hydrogen, methyl, ethyl, propyl, and isopropyl. $C_4$-$C_8$ conjugated diene monomers of formula (I) are the most preferred.

Specific first monomer examples are 1,3-butadiene, Isoprene (2-methyl-1,3-butadiene), cis- and trans-piperylene (1,3-pentadiene), 2,3-dimethyl-1,3-butadiene, cis- and trans-1,3-hexadiene, cis- and trans-2-methyl-1,3-pentadiene, cis- and trans-3-methyl-1,3-pentadiene, 4-methyl-1,3-pentadiene, 2,4-dimethyl-1,3-pentadiene, and the like.

Examples suitable to be used as the second monomer include, but are not limited to, various polar group substituted ethylene of formula (II) as shown below:

Formula (II)

in which up to three of $R_7$, $R_8$, $R_9$, and $R_{10}$ are each independently selected from the group consisting of hydrogen, methyl, ethyl, propyl, and isopropyl, and at least one of $R_7$, $R_8$, $R_9$, and $R_{10}$ is a polar group that is more polar than any one of $R_1$, $R_2$, $R_3$, $R_4$, $R_5$, and $R_6$ groups.

Exemplary polar groups include, but are not limited to, heterocyclic groups. Specific heterocyclic group examples are pyridyl (such as 2-pyridyl, 3-pyridyl, and 4-pyridyl), piperidyl, pyridazinyl, pyrimidinyl, pyrrolyl, pyranyl, pyrrolinyl, thienyl, piperidino, indolyl, isoindolinyl, isoindolyl, benzimidazolyl, benzofuranyl, chromanyl, furfuryl, pyrazoyl, furyl, pyrrolidinyl, furylmethyl, thiazinyl, thiazolyl, imidazoyl, indazolyl, thenyl, triazinyl, isoquinolyl, isoxazolyl, morpholino, triazolidinyl, morpholinyl, oxazinyl, oxazolidinyl, thiazolidinyl, oxazolinyl, oxazolyl, pentazolyl, antipyrinyl, perimidinyl, phenazinyl, phthalazinyl, pseudoindolyl, pteridyl, pyrazinyl, benzopyranyl, pyrazolidinyl, xanthenyl, pyrazolinyl, quinazolinyl, imidazolidinyl, quinolyl, benzoxazolyl, quinoxalinyl, tetrazolyl, imidazolinyl, thianaphthenyl, indolinyl, thiazolinyl, triazolyl, carbazolyl, benzoxazinyl, acridinyl, acridanyl, and the like, as well as vinyl, alkyl, cycloalkyl, aryl, alkaryl, and aralkyl derivatives thereof.

Specific examples of the second monomer are 2-vinylpyridine, vinyl pyrrolidone, vinyl carbazole, 3-vinylpyridine, 4-vinylpyridine, 2-vinylpyrrole, 3-vinylpyrrole, and the like.

The second monomer may also include, but not limited to, acrylates, methacrylates, N,N-dialkyl acrylamides, and maleimides. Suitable examples of acrylates are methyl acrylate, ethyl acrylate, isopropyl acrylate, primary-butyl acrylate, secondary-butyl acrylate, tertiary-butyl acrylate, isobutyl acrylate, cyclohexyl acrylate, 2-ethylhexyl acrylate, isobornyl acrylate, adamantly acrylate, dimethyladamantyl acrylate, lauryl acrylate, and the like. Suitable examples of methacrylates are methyl methacrylate, ethyl methacrylate, isopropyl methacrylate, primary-butyl methacrylate, secondary-butyl methacrylate, tertiary-butyl methacrylate, isobutyl methacrylate, cyclohexyl methacrylate, 2-ethylhexyl methacrylate, isobornyl methacrylate, adamantly methacrylate, dimethyladamantyl methacrylate, lauryl methacrylate, and the like. Suitable examples of N,N-dialkyl acrylamides are N,N-dimethyl acrylamide, N,N-diethyl acrylamide, N,N-diisopropyl acrylamide, and the like. Suitable examples of maleimides are N-methyl maleimide, N-ethyl maleimide, N-phenyl maleimide, and the like.

In one embodiment of the present invention, a diblock copolymer may be formed from the first monomer and the second monomer via anionic mechanism by dispersion polymerization, although emulsion polymerization is also contemplated, in which the second monomer is added to a completely polymerized first monomer. Another method of forming substantially diblock polymers is the living anionic copolymerization of a mixture of the first and the second monomers in a hydrocarbon solvent, particularly, in the absence of certain polar additives, such as ethers, tertiary amines, or metal alkoxides which could otherwise effect the polymerization of the separately constituted polymer blocks. Under these conditions, the first monomer generally polymerizes first, followed by the polymerization of the second monomer.

The preparation of the desired nano-particles, for specific applications, through the formation of block polymer micelles according to the instant invention can be accomplished and optimized by predetermining the selection and quantity of the first monomer, the second monomer, polymerization initiator, 1,2-microstructure controlling agent, antioxidant, solvent, and crosslinking agent, as well as reaction temperature etc.

According to one embodiment of the invention, a diblock polymer is formed from a first monomer and a second monomer in a hydrocarbon solvent. The first end block is soluble in the dispersion solvent, and the second end block is less soluble in the dispersion solvent. Suitable hydrocarbon solvents include aliphatic hydrocarbons, such as pentane, hexane, heptane, octane, nonane, decane, and the like, as well as alicyclic hydrocarbons, such as cyclohexane, methyl cyclopentane, cyclooctane, cyclopentane, cycloheptane, cyclononane, cyclodecane and the like. These hydrocarbons may be used individually or in combination.

With respect to the first and second monomers as well as solvents identified herein, micelles and nano-particles are generated by maintaining a temperature that is favorable to polymerization and micelle formation, for example polymerization speed, of the selected monomers in the selected solvent(s). Preferred temperatures are in the range of about −130 to 150° C., with a temperature in the range of about −90 to 80° C. being particularly preferred. For example, when 2-vinyl pyridine is used as the second monomer to synthesize the diblock copolymer, the reaction can preferably be conducted at very low temperatures (e.g. at −78° C.). In some specific embodiments, if desired, a negative catalyst having the function of slowing the polymerization, such as alkyl aluminum, can also be added to the reaction media.

According to the present invention, a block polymer of the first and second monomers is believed to aggregate to form micelle-like structures, in which the second polymer block directed toward the centers of the micelles and the first polymer blocks extend outward therefrom as tails. It is noted that a further hydrocarbon solvent charge or a decrease in polymerization mixture temperature may also be used, and may sometimes be required, to obtain formation of the micelles.

After the micelles have formed, additional first monomer and/or second monomer can be added to the polymerization mixture as desired.

The initiators of the present invention can be selected from any known organolithium compounds which are known in the art as being useful in the polymerization of the monomers having formula (I) and (II). Suitable organolithium compounds are represented by the formula as shown below:

wherein $R_{11}$ is a hydrocarbyl group containing 1 to 20, preferably 2-8, carbon atoms per $R_{11}$ group, and x is an integer of 1-4. Typical $R_{11}$ groups include aliphatic radicals and cycloaliphatic radicals, such as alkyl, cycloalkyl, cycloalkylalkyl, alkylcycloalkyl, alkenyl, aryl and alkylaryl radicals.

Specific examples of $R_{11}$ groups include, but are not limited to, alkyls such as methyl, ethyl, n-propyl, isopropyl, n-butyl, isobutyl, t-butyl, n-amyl, isoamyl, n-hexyl, n-octyl, n-decyl, and the like; cycloalkyls and alkylcycloalkyl such as cyclopentyl, cyclohexyl, 2,2,1-bicycloheptyl, methylcyclopentyl, dimethylcyclopentyl, ethylcyclopentyl, methylcyclohexyl, dimethylcyclohexyl, ethylcyclohexyl, isopropylcyclohexyl, 4-butylcyclohexyl, and the like; cycloalkylalkyls such as cyclopentyl-methyl, cyclohexyl-ethyl, cyclopentyl-ethyl, methyl-cyclopentylethyl, 4-cyclohexylbutyl, and the like; alkenyls such as vinyl, propenyl, and the like; arylalkyls such as 4-phenylbutyl; aryls and alkylaryls such as phenyl, naphthyl, 4-butylphenyl, p-tolyl, and the like.

Other lithium initiators include, but are not limited to, 1,4-dilithiobutane, 1,5-dilithiopetane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

Mixtures of different lithium initiators can also be employed, preferably containing one or more lithium compounds such as $R_{11}(Li)_x$.

Preferred lithium initiators include n-butyllithium, sec-butyllithium, tert-butyllithium, 1,4-dilithiobutane, and mixtures thereof.

Other lithium catalysts which can be employed are lithium dialkyl amines, lithium dialkyl phosphines, lithium alkyl aryl phosphines, lithium diaryl phosphines, and mixtures thereof.

Functionalized lithium initiators are also contemplated as useful in the present invention. Preferred functional groups include amines, formyl, carboxylic acids, alcohol, tin, silicon, silyl ether and mixtures thereof. A nano-particle including diblock polymers initiated with a functionalized initiator may include functional groups on the surface of the nano-particle.

The initiator of the present invention is employed in amounts designed to result in the desired molecular weight of the block polymer. The ratio of millimoles of initiator per hundred grams of monomer for use in the present invention ranges between 0.1 millimoles to 100 millimoles, preferably 0.2 millimoles to 20 millimoles.

For a specific 1,3-diene of formula (I), either 1,2-addition or 1,4-addition can occur when it is subject to the polymerization reaction. As such, a 1,2-microstructure controlling agent is optionally used to control the 1,2-addition mechanism, and also, as a result, to control the final 1,2-microstructure content of the conjugated diene polymer blocks in the nano-particle. The 1,2-microstructure controlling agents used in the present invention are linear oxolanyl oligomers represented by the structural formula (III) and cyclic oligomers represented by the structural formula (IV), as shown below:

Formula (III)

Formula (IV)

wherein $R_{12}$ and $R_{13}$ are independently hydrogen or a $C_1$-$C_8$ alkyl group; $R_{14}$, $R_{15}$, $R_{16}$, and $R_{17}$ are independently hydrogen or a $C_1$-$C_6$ alkyl group; y is an integer of 1 to 5 inclusive, and z is an integer of 3 to 5 inclusive.

The oxolanyl 1,2-microstructure controlling agents are prepared by methods known to those skilled in the art. Typically the agents are prepared by reacting furan, which is unsubstituted in either or both of the 2- or 5-positions, with either an aldehyde or a ketone, such as acetone, in the presence of an acid such as hydrochloric acid. Careful control of the reaction parameters allows for the production of a product containing up to 95 percent of dimers, trimers, and tetramers. Once the linear oligomers or cyclic structures are formed these reaction products are hydrogenated in the presence of suitable hydrogenation catalysts such as nickel based catalysts. Any suitable hydrogenation process known in the art may be employed to produce the 1,2-microstructure controlling agents of structural formulas (III) or (IV).

While unsubstituted furans are the preferred reactant, 2-alkyl-furans containing up to six carbon atoms in the alkyl group can be employed in the production of the oxolanyl oligomers of structural formula (III). When 2-alkyl-furans are employed, furfuryl dimers are the main reaction product. The 2-alkyl-furan also may end cap any oligomers formed if furan is used as a coreactant. The cyclic oxolanyl oligomer precursors are formed only from the reaction of a furan compound which is unsubstituted in the 2,5-position with either one or more aldehydes or one or more ketones or a mixture thereof.

Suitable 1,2-microstructure controlling agents include, but are not limited to, bis(2-oxolanyl) methane; 1,1-bis(2-oxolanyl) ethane; bistetrahydrofuryl propane; 2,2-bis(2-oxolanyl) propane; 2,2-bis(5-methyl-2-oxolanyl) propane; 2,2-bis-(3,4,5-trimethyl-2-oxolanyl) propane; 2,5-bis(2-oxolanyl-2-propyl) oxolane; octamethylperhydrocyclotetrafurfurylene (cyclic tetramer); 2,2-bis(2-oxolanyl) butane; and the like. A mixture of two or more 1,2-microstructure controlling agents also can be used. The preferred 1,2-microstructure controlling agents for use in the present invention are oligomeric oxolanyl propanes (OOPs).

In one embodiment of the present invention, as the charge of 1,2-microstructure controlling agent increases, the percentage of 1,2-microstructure (vinyl content) increases in the block of conjugated diene with formula (I) in the surface layer of the polymer nano-particle. The ratio of the 1,2-microstructure controlling agent to the monomers can vary from a minimum as low as 0 to a maximum as great as about 60 millimoles, preferably about 0.2 to 10 millimoles, of 1,2-microstructure controlling agent per hundred grams of monomer being charged into the reactor. The 1,2-microstructure content of the conjugated diene block is preferably between about 10% and 95%, and preferably between about 10% and 80%.

Optionally, antioxidant can be added to the reaction system during, for example, the polymerization of the first monomer. Suitable antioxidants include, but are not limited to, butylated hydroxyl toluene (BHT) such as 2,6-ditertbutyl-4-methyl phenol or other stereochemically-hindered phenols, thioethers, and phospites etc.

According to the present invention, the micelle formed by the polymerization of the first and second monomers is preferably crosslinked to enhance the uniformity and permanence of shape and size of the resultant nano-particle. In a specific embodiment of the invention, after formation of the micelles, a cross-linking agent is added to the polymerization mixture. The cross-linking agent has at least two reactive groups such as vinyl which can be polymerized and result in a crosslinked polymer network. Preferably, a selected crosslinking agent has an affinity to the second polymer block and can migrate to the center of the micelles due to its compatibility with the second monomers and initiator residues present in the center of the micelle and its relative incompatibility with the dispersion solvent and the first polymer block present in the outer layer of the micelle. The crosslinking agents can crosslink the central core of the micelle to form the desired nano-particle of the present invention. Consequently, nano-particles are formed from the micelles with a core including second monomers and a surface layer including first monomers. Preferred crosslinking agents are di-vinyl- or tri-vinyl-substituted aromatic hydrocarbons. A preferred crosslinking agent is divinylbenzene (DVB).

The block polymer, preferably has a $M_w$ of about 1,000 to 2,000,000, more preferably between about 2,000 and 1,000,000. A typical diblock polymer will be comprised of 1 to 99% by weight first monomer block and 99 to 1% by weight second monomer block, more preferably 90 to 10% by weight, and most preferably 80 to 20% by weight of each contributed monomer type. Without being bound by theory, it is believed that an exemplary micelle will be comprised of ten to five hundred block copolymers yielding, after crosslinking, a nano-particle having a $M_w$ of between about 10,000 and 200,000,000, preferably between about 20,000 and 100,000,000.

The nano-particles have diameters, expressed as a mean average diameter, that are preferably less than about 120 nm, more preferably less than about 90 nm, and most preferably less than about 80 nm. The nano-particles preferably are substantially monodisperse and uniform in shape. The dispersity is represented by the ratio of $M_w$ to $M_n$, with a ratio of 1 being substantially monodisperse. The polymer nano-particles of the present invention preferably have a dispersity of about 1.7 or less, more preferably less than about 1.6, even more preferably less than about 1.4, and most preferably less than about 1.2. Moreover, the nano-particles are preferably spherical, though shape defects are acceptable, provided the nano-particles generally retain their discrete nature with little or no polymerization between particles.

The nano-particles of the present invention advantageously can be subject to several mechanisms for surface modifications, functionalization, and general characteristic tailoring to improve their performance in rubbers, thermoplastics, and other industrial applications.

The density of the nanoparticle may be controlled by including both diblock and monoblock polymer chains in the micelles. One method for forming such polymer chains includes forming a first polymer block in a hydrocarbon solvent. After formation of the first polymer block, a second monomer is added to the polymerization, along with additional initiator. A portion of the second monomer polymerizes onto the first polymer to form a diblock polymer as well as a second portion of the second monomer forms a separate second polymer which is a mono-block polymer.

After micelle formation, or alternatively, after crosslinking, the first polymer blocks may be hydrogenated to form a modified surface layer. A hydrogenation step may be carried out by methods known in the art for hydrogenating polymers, particularly polydienes. A preferred hydrogenation method includes placing the crosslinked nano-particles in a hydrogenation reactor in the presence of a catalyst. After the catalyst has been added to the reactor, hydrogen gas ($H_2$) is charged to the reactor to begin the hydrogenation reaction. The pressure is adjusted to a desired range, preferably between about 10 and 3000 kPa, more preferably between about 50 and 2600 kPa. $H_2$ may be charged continuously or in individual charges until the desired conversion is achieved. Preferably, the hydrogenation reaction will reach at least about 40% conversion, more preferably greater than about 85% conversion.

Preferred catalysts include known hydrogenation catalysts such as Pt, Pd, Rh, Ru, Ni, and mixtures thereof. The catalysts may be finely dispersed solids or absorbed on inert supports such as carbon, silica, or alumina. Especially preferred catalysts are prepared from nickel octolate, nickel ethylhexanoate, and mixtures thereof.

The surface layer formed by an optional hydrogenation step will vary depending on the identity of the monomer units utilized in the formation of the nano-particle surface layer. For example, if the first polymer block contains 1,3-butadiene monomer units, the resultant nano-particle layer after hydrogenation will be a crystalline poly(ethylene) layer. In another embodiment, a layer may include both ethylene and propylene units after hydrogenation if the non-hydrogenated first polymer block contains isoprene monomer units.

A variety of applications are contemplated for use in conjunction with the nano-particles of the present invention. Furthermore, modification of the nano-particles renders them suitable for many other different applications. All forms of the present inventive nano-particles are, of course, contemplated for use in each of the exemplary applications and all other applications envisioned by the skilled artisan.

After the polymer nano-particles have been formed, they may be blended with a rubber to improve the physical characteristics of the rubber composition. Nano-particles are useful modifying agents for rubbers because they are discrete particles which are capable of dispersing uniformly throughout the rubber composition, resulting in uniformity of physical characteristics. Furthermore, certain of the present polymer nano-particles are advantageous because the surface layer of poly(conjugated diene) is capable of bonding with the rubber matrix due to the accessibility of the double bonds in the poly(conjugated diene).

The present polymer nano-particles are suitable for modifying a variety of rubbers including, but not limited to, random styrene/butadiene copolymers, butadiene rubber, poly (isoprene), nitrile rubber, polyurethane, butyl rubber, EPDM, and the like. Advantageously, the inclusion of the present nano-particles have demonstrated rubbers having improved tensile and tear strength of at least about 30% over a rubber modified with non-spherical copolymers.

Furthermore, nano-particles with hydrogenated surface layers may demonstrate improved compatibility with specific rubbers. For example, nano-particles including a hydrogenated polyisoprene surface layer may demonstrate superior bonding with and improved dispersion in an EPDM rubber matrix due to the compatibility of hydrogenated isoprene with EPDM rubber.

Additionally, nano-particles with copolymer surfaces may demonstrate improved compatibility with rubbers. The copolymer tails with the surface layer of the nano-particles may form a brush-like surface. The host composition is then able to diffuse between the tails allowing improved interaction between the host and the nano-particles.

Hydrogenated nano-particles prepared in accordance with the present invention may also find application in hard disk technology. The hydrogenated nano-particles, when compounded with a polyalkylene and a rubber, demonstrate a tensile strength comparable to that necessary in hard disk drive compositions.

Nano-particles prepared in accord with the present invention, whether hydrogenated or non-hydrogenated may also be blended with a variety of thermoplastic elastomers, such as SEPS, SEBS, EEBS, EEPE, polypropylene, polyethylene, and polystyrene. For example, nano-particles with hydrogenated isoprene surface layers may be blended with a SEPS thermoplastic to improve tensile strength and thermostability.

Surface functionalized nano-particles prepared in accordance with the present invention, whether hydrogenated or non-hydrogenated, may also be compounded with silica containing rubber compositions. Including surface functionalized nano-particles in silica containing rubber compositions has been shown to decrease the shrinkage rates of such silica containing rubber compositions.

The nano-particle of the present invention can also be used to modify rubber in situations requiring superior damping properties, such as engine mounts and hoses (e.g. air conditioning hoses). Rubber compounds of high mechanical strength, super damping properties, strong resistance to creep are demanded in engine mount manufacturers. In engine mount, a rubber, because it sits in a packed and hot position, requires very good characteristics. Utilizing the nano-particles within selected rubber formulations can improve the characteristics of the rubber compounds.

Similarly, the nano-particles can be added into typical plastic materials, including polyethylene, polypropylene, polystyrene, to for example, enhance impact strength, tensile strength and damping properties.

Of course, the present inventive nano-particles are also suited to other presently existing applications for nano-particles, including the medical field, e.g. drug delivery and blood applications, ER fluids, information technology, e.g. quantum computers and dots, aeronautical and space research, environment and energy, e.g., oil refining, and lubricants.

EXAMPLES

A number of micellar particles containing poly(vinyl pyridine) were synthesized. Butadiene in hexane (21.8 weight percent butadiene), hexane, butyllithium (BuLi, 1.68M in hexane), and BHT solution in hexane were used as supplied. Technical grade divinylbenzene (DVB) (Aldrich product 41,456-5, 80% as a mixture of isomers) was passed through a column of inhibitor remover (activated alumina) under nitrogen before use. 2-vinyl pyridiene (2-VP) was also passed through a column of inhibitor remover (activated alumina) under nitrogen before use. Both DVB and 2-VP were stored at −15° C. over calcium hydride. Neat OOPS (oligomeric oxolanyl propanes, 1.6M) was similarly treated, and used as a 1.6 M solution in hexane, stored over calcium hydride.

Example 1

A 2-gallon reactor was used for preparation of polybutadiene. 5.30 lbs of hexane was charged into the reactor and the reactor was vented. 4.57 lbs butadiene/hexane blend (21.8 wt % butadiene) was charged into the reactor. The temperature of the mixture was set to 122 F. When the temperature stabilized (all of the thermal sensors in the reactor reached a constant value) at 122 F, 0.45 ml OOPS (1.6M) solution was charged into the reactor. Subsequently, 5.4 ml BuLi (1.64M) solution was charged into the reactor. The reaction then proceeded for 5 hours until 100% conversion.

The resultant product was anionic living. A portion of the living polymer was terminated by adding isopropanol to the reactor. After termination with isopropanol, the GPC analysis, using PS as the standard, showed the molecular weight of the polybutadiene: $M_n=53800$, $M_w=58420$, $M_p=58380$, and $M_w/M_n=1.085$.

Example 2

300 ml of the living polybutadiene (made in Example 1) was charged into a dry 1.5 L vessel. The vessel was then placed in a dry ice bath. After two hours of cooling, the temperature of the reaction mixture was −78° C. 20 ml of 2-VP was added to the content of the vessel. After one-hour reaction, 10 ml of DVB was added to the vessel. The vessel was then allowed to slowly warm up to room temperature of 23° C. After 1.5 hour reaction, the solution in the vessel turned into a red jelly-like material. The material in the vessel was then terminated with 0.5 ml isopropanol. The material was then taken out and dried under vacuum. GPC analysis showed that the resultant material contains about 50% of micellar particles. The impurity came from the unreacted polybutadiene. The material was dissolved in THF. The particles can be precipitated out using Hexane. H-NMR analysis showed that the particles contained 80% of 2-VP by weight.

Examples 3, 4 and 5

For examples 3, 4, and 5, the same procedure as described in Example 2 was used, and the amounts of reactants used are listed in the following table:

|  | Example 2 | Example 3 | Example 4 | Example 5 |
|---|---|---|---|---|
| BD solution used | 300 ml | 300 ml | 300 ml | 300 ml |
| 2-VP | 20 ml | 25 ml | 30 ml | 35 ml |
| DVB | 10 ml | 12 ml | 15 ml | 20 ml |
| Product |  |  |  |  |
| $M_n$ |  | 289200 | 287700 | 356990 | 409220 |
| $M_w$ | 424840 | 404160 | 572590 | 695430 |
| $M_p$ | 410470 | 429390 | 682450 | 739792 |
| $M_w/M_n$ | 1.47 | 1.40 | 1.60 | 1.70 |

Figure 1:
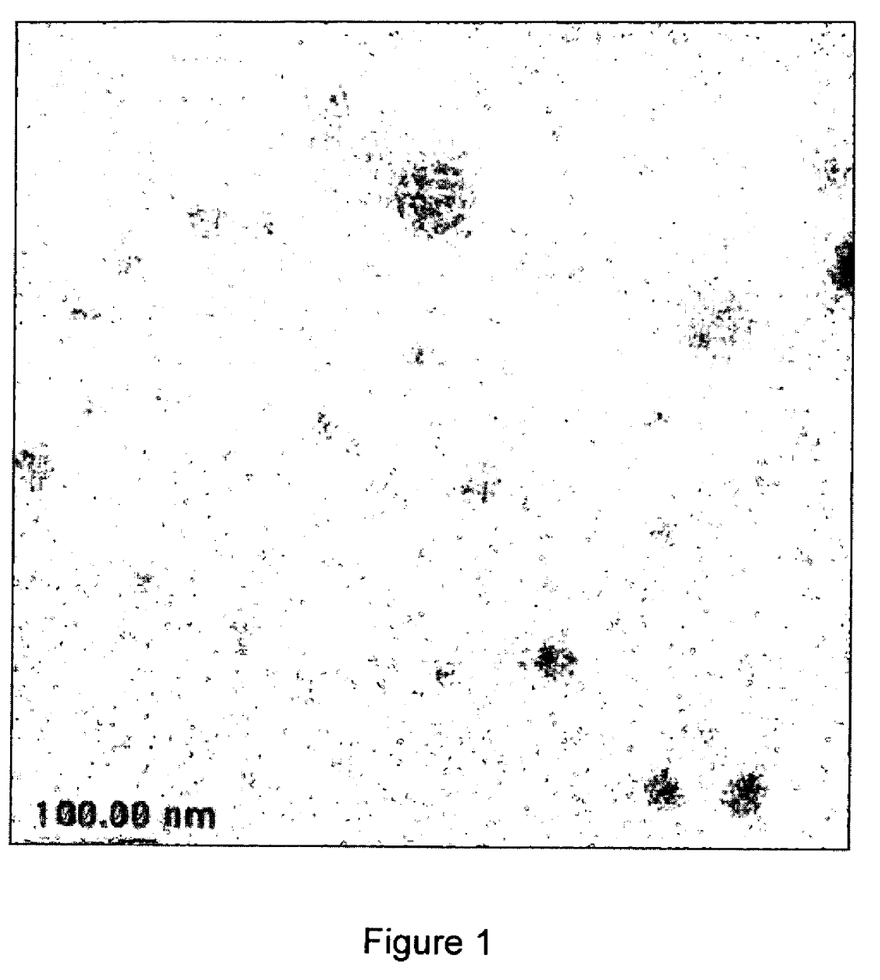
FIG. 1 is a transmission electron microscopy (TEM) image of the polymeric nanoparticles formed from a poly (butadiene-co-2-vinylpyridine) in one embodiment of the present invention.
Figure 2:
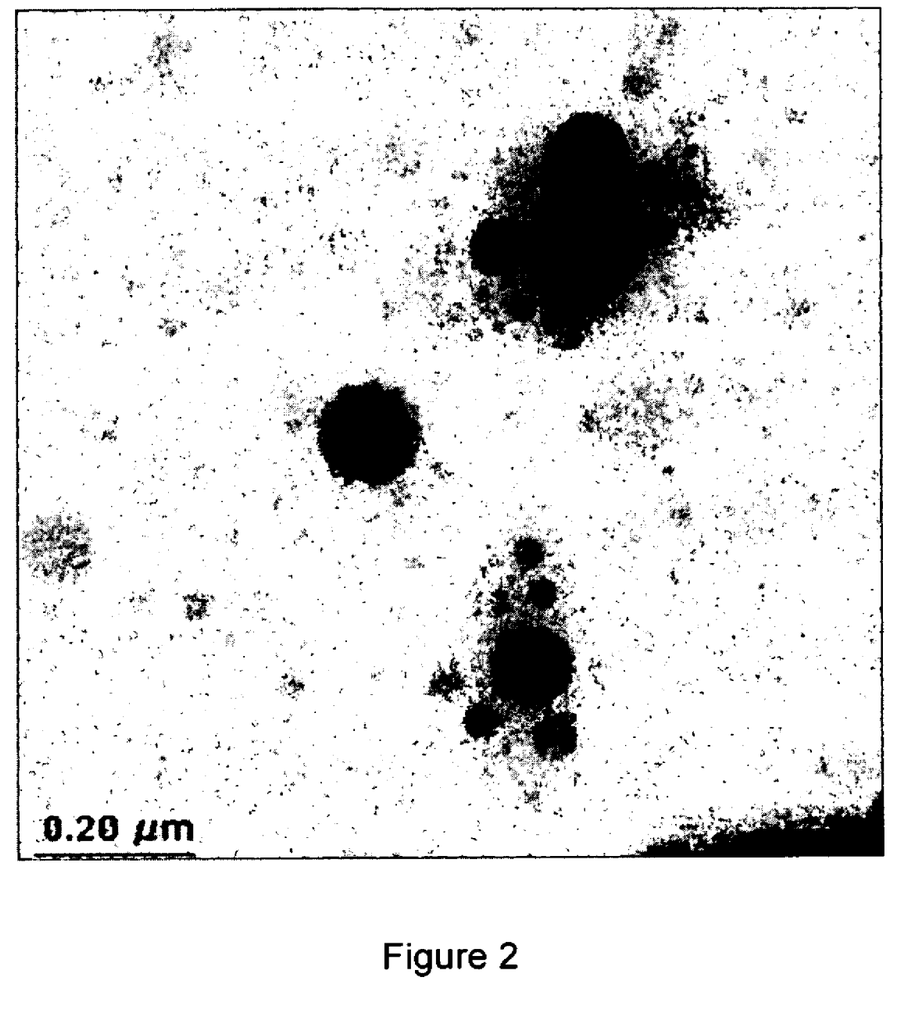
FIG. 2 is a TEM image of the polymeric nanoparticles formed from a poly (butadiene-co-2-vinylpyridine) in one embodiment of the present invention.
Figure 3:
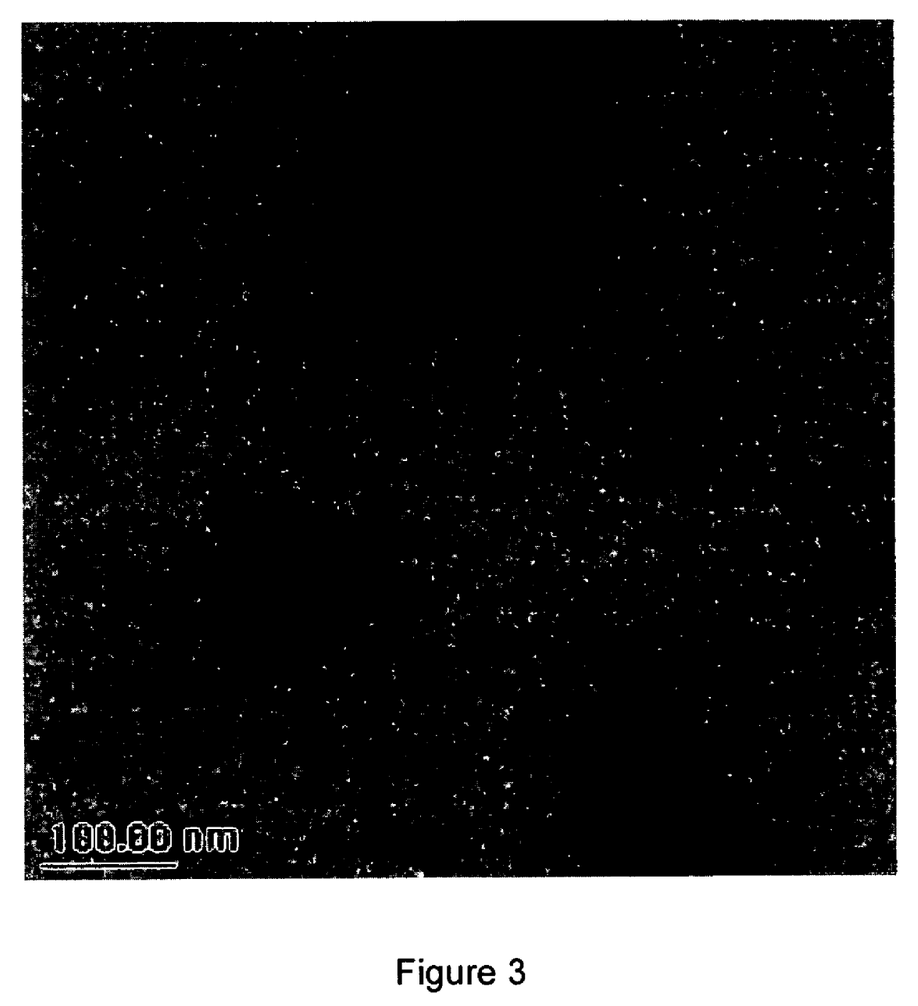
FIG. 3 is a TEM image of the polymeric nanoparticles formed from a poly (butadiene-co-2-vinylpyridine) in one embodiment of the present invention.

FIG. 1 presents an overall view of a particular sample of Example 2. FIGS. 2 and 3 show some details in the TEM pictures of the sample of Example 2. The distribution of size of the particles was broad, ranging from 120 to 5 nm.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A tire comprising:
core-shell nanoparticles including a shell comprising a polymer formed from a first monomer of at least formula (I):

Formula (I)

in which R1 and R2 are hydrogen, and each of R3, R4, R5, and R6 is independently selected from the group consisting of hydrogen, methyl, ethyl, propyl, and isopropyl; and a core comprising a polymer formed from at least a second monomer of formula (II):

Formula (II)

in which up to three of R7, R8, R9, and R10 are each independently selected from the group consisting of hydrogen, methyl, ethyl, propyl, and isopropyl, and at least one of R7, R8, R9, and R10 is a polar group that is more polar than any one of R1, R2, R3, R4, R5, and R6 groups;
wherein the polar group in the second monomer is a heterocyclic group;
wherein the nano-particles are cross-linked with di-vinyl- or tri-vinyl-substituted aromatic hydrocarbon;
wherein the nano-particles are dispersed in a rubber matrix.

2. The tire of claim 1, in which the polymer of the first monomer and the polymer of the second monomer are two blocks of a copolymer.

3. The tire of claim 1, in which the first monomer is a C4-C8 conjugated diene monomer.

4. The tire of claim 1, in which the polar group in the second monomer is selected from the group consisting of pyridyl, 2-pyridyl, 3-pyridyl, 4-pyridyl, piperidyl, pyridazinyl, pyrimidinyl, pyrrolyl, pyranyl, pyrrolinyl, thienyl, piperidino, indolyl, isoindolinyl, isoindolyl, benzimidazolyl, benzofuranyl, chromanyl, furfuryl, pyrazoyl, furyl, pyrrolidinyl, furylmethyl, thiazinyl, thiazolyl, imidazoyl, indazolyl, thenyl, triazinyl, isoquinolyl, isoxazolyl, morpholino, triazolidinyl, morpholinyl, oxazinyl, oxazolidinyl, thiazolidinyl, oxazolinyl, oxazolyl, pentazolyl, antipyrinyl, perimidinyl, phenazinyl, phthalazinyl, pseudoindolyl, pteridyl, pyrazinyl, benzopyranyl, pyrazolidinyl, xanthenyl, pyrazolinyl, quinazolinyl, imidazolidinyl, quinolyl, benzoxazolyl, quinoxalinyl, tetrazolyl, imidazolinyl, thianaphthenyl, indolinyl, thiazolinyl, triazolyl, carbazolyl, benzoxazinyl, acridinyl, acridanyl, and the vinyl, alkyl, cycloalkyl, aryl, alkaryl, and aralkyl derivatives thereof.

5. The tire of claim 1, in which the second monomer is selected from the group consisting of 2-vinylpyridine, vinyl pyrrolidone, vinyl carbazole, 3-vinylpyridine, 4-vinylpyridine, 2-vinylpyrrole, 3-vinylpyrrole, maleimides and mixture thereof.

6. The tire of claim 1, wherein the shell comprises at least one functional group.

7. The tire of claim 1, in which a 1,2-microstructure content of the polymer formed from the first monomer ranges between about 10% and 95%.

8. The tire of claim 1, in which the core polymer formed from the second monomer is crosslinked.

9. The tire of claim 1, wherein the nanoparticles have a mean average diameter of less than about 120 nm.

10. The tire of claim 1, wherein the nanoparticles have a $M_w$ of between about 10,000 and 200,000,000.

11. The tire of claim 1, having a dispersity of about 1.7 or less.

12. The tire of claim 1, wherein the nanoparticles have a spherical shape.

13. The tire of claim 1, wherein the cross-linking agent is divinylbenzene.

14. The tire of claim 1, wherein the rubber with nanoparticles has improved tensile and tear strength of at least about 30% over a control rubber that differs in that it is modified with non-spherical copolymers.

15. The tire of claim 1 wherein the nanoparticles are formed by living anionic polymerization of the first and the second monomer.

16. The tire of claim 15, wherein the first and second monomers are polymerized in the presence of a negative catalyst to slow down the reaction speed.

17. The tire of claim 1, wherein a 1,2-microstructure content of the first monomer is controlled by a linear oxolanyl oligomer represented by the structural formula (III) or a cyclic oligomer represented by the structural formula (IV), as shown below:

Formula (III)

Formula (IV)

wherein R12 and R13 are independently hydrogen or a C1-C8 alkyl group; R14, R15, R16, and R17 are independently hydrogen or a C1-C6 alkyl group; y is an integer of 1 to 5 inclusive, and z is an integer of 3 to 5 inclusive.

18. A tire comprising:
core-shell nanoparticles including:
a shell comprising a first block of a block polymer formed from a first monomer of at least formula (I):

Formula (I)

in which R1 and R2 are hydrogen, and each of R3, R4, R5, and R6 is independently selected from the group consisting of hydrogen, methyl, ethyl, propyl, and isopropyl; and a core comprising a second block of the block polymer formed from at least a second monomer of formula (II):

Formula (II)

in which up to three of R7, R8, R9, and R10 are each independently selected from the group consisting of hydrogen, methyl, ethyl, propyl, and isopropyl, and at least one of R7, R8, R9, and R10 is a polar group that is more polar than any one of R1, R2, R3, P4, R5, and R6 groups;

wherein the polar group in the second monomer is a heterocyclic group;
wherein the nano-particles are cross-linked with di-vinyl- or tri-vinyl-substituted aromatic hydrocarbon;
wherein the nano-particles are dispersed in a rubber matrix;
in which the first block and the second block are two blocks of the block polymer.

19. The tire of claim 18, wherein the host is a rubber selected from the group consisting of: styrene/butadiene copolymers, butadiene rubber, poly(isoprene), nitrile rubber, polyurethane, butyl rubber, and EPDM.

20. The tire of claim 18, wherein the host is styrene/butadiene copolymers.

21. A tire including a core-shell nano-particle comprising:
a shell comprising a conjugated diene; and a core comprising a polymer formed from at least a second monomer of formula (II):

Formula (II)

in which up to three of R7, R8, R9, and R10 are each independently selected from the group consisting of hydrogen, methyl, ethyl, propyl, and isopropyl, and at least one of R7, R8, R9, and R10 is a polar group that is more polar than any one of, R2, R3, R4, R5, and R6 groups;
wherein the polar group in the second monomer is a heterocyclic group;
wherein the nano-particles are cross-linked with di-vinyl- or tri-vinyl-substituted aromatic hydrocarbon.

* * * * *